United States Patent
Eberstadt, III et al.

(10) Patent No.: US 10,670,157 B2
(45) Date of Patent: Jun. 2, 2020

(54) MARINE DRAIN VALVE

(71) Applicants: Rudolph Eberstadt, III, Norwalk, CT (US); Peter Otis Eberstadt, Grafton, MA (US)

(72) Inventors: Rudolph Eberstadt, III, Norwalk, CT (US); Peter Otis Eberstadt, Grafton, MA (US)

(*) Notice: Subject to any disclaimer, the term of this patent is extended or adjusted under 35 U.S.C. 154(b) by 0 days.

(21) Appl. No.: 16/406,812

(22) Filed: May 8, 2019

(65) Prior Publication Data

US 2019/0293195 A1    Sep. 26, 2019

Related U.S. Application Data

(63) Continuation-in-part of application No. PCT/US2018/033847, filed on May 22, 2018, which is a continuation-in-part of application No. 15/603,750, filed on May 24, 2017, now Pat. No. 10,059,406.

(51) Int. Cl.
*B63B 13/00* (2006.01)
*F16K 15/04* (2006.01)

(52) U.S. Cl.
CPC .............. *F16K 15/04* (2013.01); *B63B 13/00* (2013.01)

(58) Field of Classification Search
CPC ................................ B63B 13/00; B63B 19/26
See application file for complete search history.

(56) References Cited

U.S. PATENT DOCUMENTS

| | | | |
|---|---|---|---|
| 2,997,975 A | 8/1961 | Moeller | |
| 3,757,726 A | 9/1973 | Moeller | |
| 3,812,810 A | 5/1974 | Moeller | |
| 4,516,515 A | 5/1985 | Johnson | |
| 4,932,348 A | 6/1990 | Nix et al. | |
| 4,986,777 A | 1/1991 | Preston | |
| 5,162,793 A | 11/1992 | Plost et al. | |
| 5,724,908 A | 3/1998 | Murray | |
| 5,950,987 A | 9/1999 | Kaneko | |
| 6,038,992 A | 3/2000 | Smith | |
| 6,050,867 A * | 4/2000 | Shields | B63B 13/02 114/183 R |

(Continued)

OTHER PUBLICATIONS

2016 Moeller Marine Products Catalog, available at http://moellermarine.com/customer-resources/catalog/, pp. 69-72.

(Continued)

*Primary Examiner* — S. Joseph Morano
*Assistant Examiner* — Jovon E Hayes
(74) *Attorney, Agent, or Firm* — Gordon & Jacobson, P.C.

(57) ABSTRACT

A valve for use with a vessel drain tube includes a body extending along a longitudinal axis. The body has an outer surface and an inner surface defining a bore extending longitudinally from a first end to a second end. The valve includes an external seal on the outer surface of the body for sealing with the drain tube, at least one internal seal on the inner surface extending into the bore, a retaining member extending at least partially into the bore and being spaced from the internal seal, and a sealing member displaceable between the internal seal and the retaining member. The sealing member is configured to seal with the internal seal in a valve closed, first configuration and to not seal with the internal seal in a valve open, second configuration.

20 Claims, 35 Drawing Sheets

(56) References Cited

U.S. PATENT DOCUMENTS

| | | | |
|---|---|---|---|
| 6,227,132 B1 | 5/2001 | Garcia | |
| 6,338,309 B1 * | 1/2002 | Michelson | |
| 6,357,376 B1 * | 3/2002 | Purio | B63B 13/00 |
| | | | 114/183 R |
| 6,390,007 B1 | 5/2002 | Walker | |
| 6,477,971 B2 | 11/2002 | Green | |
| 6,736,081 B1 | 5/2004 | Green et al. | |
| 6,875,070 B2 * | 4/2005 | Nakajima | F01P 11/0276 |
| | | | 440/88 N |
| 7,140,316 B2 * | 11/2006 | McIntire | B63B 13/00 |
| | | | 114/183 R |
| 7,434,528 B1 | 10/2008 | McKibben | |
| 8,146,951 B2 | 4/2012 | Tung | |
| 8,256,365 B2 | 9/2012 | Wise et al. | |
| 9,079,637 B2 | 7/2015 | Samowski et al. | |
| 9,527,567 B1 * | 12/2016 | Loftin | B63H 21/383 |
| 10,059,406 B1 | 8/2018 | Eberstadt, III | |
| 2006/0260525 A1 | 11/2006 | DeGart | |
| 2009/0050043 A1 | 2/2009 | Alvarez | |
| 2009/0107383 A1 | 4/2009 | Cotton | |
| 2010/0263745 A1 | 10/2010 | Symes | |

OTHER PUBLICATIONS

Search Report and Written Opinion of Application No. PCT/US2018/33847 dated Aug. 24, 2018.

\* cited by examiner

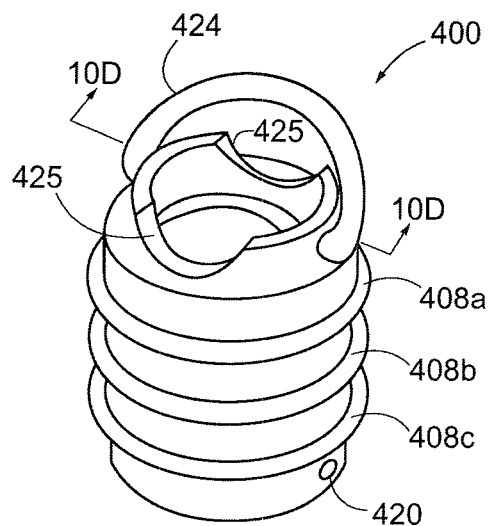 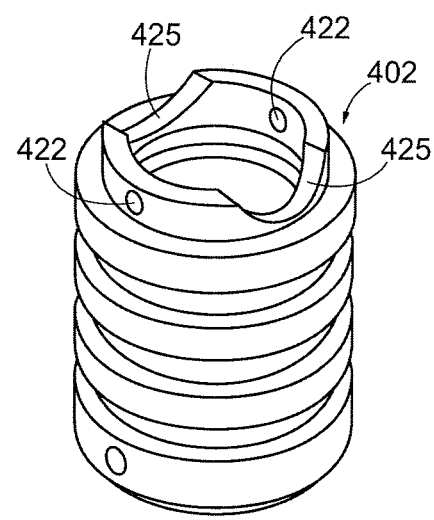
FIG. 10A    FIG. 10B
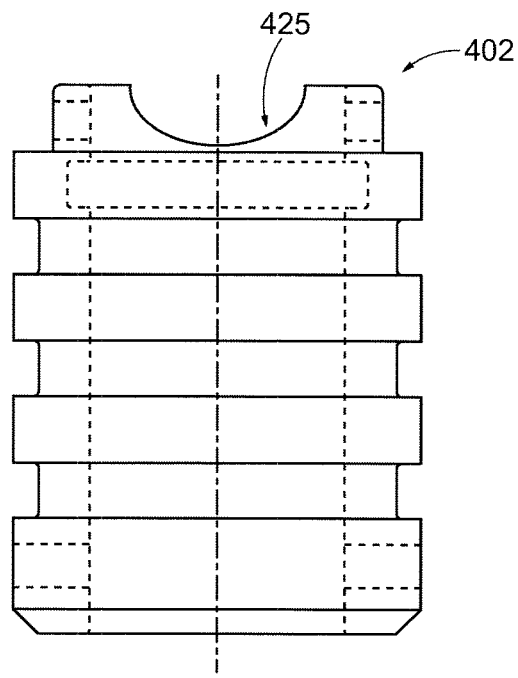
FIG. 10C

MARINE DRAIN VALVE

CROSS-REFERENCE TO RELATED APPLICATIONS

This application is a continuation-in-part of International Patent Application No. PCT/US2018/033847, filed May 22, 2018, which is a continuation-in-part of U.S. patent application Ser. No. 15/603,750, filed May 24, 2017, now U.S. Pat. No. 10,059,406, issued Aug. 28, 2018, the entire contents of both of which are incorporated herein by reference.

BACKGROUND

1. Field

The present application relates to boats and watercraft and, more particularly, to a drain valve for draining water from interior compartments of boats and watercraft.

2. State of the Art

During operation of boats and other watercraft, water can accumulate in interior compartments of the boat. Further, boat operators will often clean these interior compartments with water (or other fluid) which can also result in accumulations of water (or other fluid) within the interior compartments of the boat. Consequently, drains and drain plugs are often installed in the interior compartments of boats so that water accumulated therein can be drained outside of the boat.

For example, in a typical boat, a drain tube is used to drain water from the passenger compartment through the bottom or hull of the boat to the exterior of the boat. The drain tube generally consists of a cylindrical brass or aluminum tube 1 (See FIG. 1A) extending fully across the thickness of the bottom of the hull and having rolled flanges 1a at opposite ends of the tube, which retain the tube in the hull and sealed therewith. The tube 1 can be plugged with a bailer plug 2 or 3 (FIGS. 1B and 1C) to prevent water from entering the interior compartment of the boat when the boat is operating in the water. Usually, the drain tubes 1 are fitted to the boats as original equipment and are present on the boat before delivery to an end user. Examples of bailer plugs are "Snap-Tite", "Turn-Tite", and "Trail-n-Bail" plugs supplied by Moeller Marine Products of Sparta, Tenn. Bailer plugs 2 and 3 are typically radially expandable so that they can fit and seal a range of drain pipe diameters, such as 1 to 1.25 inch diameter. When the boat is out of the water, as shown in FIG. 2, a user can drain water from the interior compartment of the boat by removing the plug 3, as shown in FIG. 3, so that the water in the passenger compartment drains through the open drain tube 1. Also, the drain tubes are designed so that they exit at a location that is above the water line when the boat is docked and unloaded of passengers or when the boat is underway. Thus, users can remove the drain plug from the drain tube when the boat is docked and when the boat is underway to drain water from the interior compartment of the boat.

One problem associated with drain assemblies of the prior art is that the boat operator may forget to replace the plug after draining the water out of the interior compartment of the boat prior to returning the boat back into the water, or prior to or shortly after re-entering the boat when docked or after draining the boat while underway. For example, it is common for boat operators to open the drain after the boat has been placed on the trailer to allow the water to drain out of the interior compartments after the boat has been removed from the water. If the boat operator forgets to replace the plug, water can then enter the interior compartments of the boat the next time the boat is positioned in the water. In fact, water can enter through the drain in sufficient quantities that the boat can sink. Also, it is common for boat operators to leave the drain valves in their boat after they dock their boat, such that rain water may enter and accumulate in the boat.

One solution to these problems is a one-way drain assembly that incorporates a flapper valve. This device includes an aperture that extends through a wall of the boat wherein a valve member is mounted within the aperture in a pivoting fashion. Preferably, the valve member can only pivot so as to open the aperture in response to water flowing from the boat compartment to the exterior of the boat. Further, the valve member is configured so that when water is flowing from the exterior of the boat into the interior of the boat, the valve member closes off the aperture and prevents the water from entering the boat.

While the flapper type drain valve reduces the likelihood of water entering the interior compartments of the boat after the boat operator has failed to reinstall a plug, these devices suffer from some problems. In particular, these devices are typically made of a plastic that degrades as a result of exposure to UV light. Consequently, sunlight often damages these devices to a point where the valve member breaks and does not close off the aperture when needed. Further, these devices are also exposed to oil and other foreign matter within the water, which inhibits the correct pivoting motion of the flapper valve member to the point where the valve member does not adequately seal the boat. For example, the foreign matter may cause the flapper to get stuck in a fixed position which either inhibits proper operation of the drain or allows water to flow through the drain into the boat.

Hence, even though the flapper-type drain valves represent an improvement over the standard drains that simply incorporate a plug, it still suffers from serious shortcomings in its ability to prevent water from entering interior compartments of the boat when the boat is positioned in a body of water.

Also, U.S. Pat. No. 6,357,376 describes a boat drain assembly that can be positioned within an opening in a wall of a boat. The assembly includes a member adapted to be positioned within the opening. The member has an upper end that is positioned substantially flush with an inner surface of the boat wall and defines an interior opening that extends across substantially the entire opening in the boat wall and is adapted for water to flow from an interior compartment of the boat to a central passageway defined by the member. The central passageway extends through the wall of the boat when the member is positioned in the opening. The central passageway includes a reduced aperture portion that has a cross sectional area which is less than the cross-sectional area of the central passageway.

The assembly also includes a ball that is positioned within the central passageway and is captured therein so as to be positioned adjacent the reduced aperture and retained within the central passageway within the wall of the boat. The ball floats in the central passageway when water is flowing through the reduced aperture from the interior compartment of the boat to the exterior of the boat and wherein the ball is urged into the reduced aperture when water is urged to flow from the exterior of the boat into the interior compartment to thereby inhibit the flow of water from the exterior of the boat into the interior of the boat through the central passageway.

However, the valve assembly in U.S. Pat. No. 6,357,376 requires that a user drill a hole through the wall of the boat for the valve assembly to be received in and requires that the length of the valve assembly be at least as long as the thickness of the wall of the boat. Otherwise, if the length of the central passageway did not extend fully across the thickness of the wall of the boat, it would be possible in the case of hollow wall boats that water could fill the hollow wall of the boat rather than pass through the wall via the valve assembly. Moreover, due to the variation in the thickness of boat hulls among different boats as well as variations in thicknesses of boat hulls throughout the same boat, the length of the valve assembly cannot be standardized. Also, screws are needed to secure the valve assembly to the wall of the boat, requiring the user to drill yet more holes in the boat, which may cause stress cracks and leaks in the wall of the boat.

Thus, there is a need for an improved drain valve for marine vessels.

SUMMARY

According to one aspect, further details of which are provided herein, a marine drain valve for use with a marine drain tube that extends through a wall of a marine vessel includes an elongated body extending along a central axis. The valve includes an elongated body extending along a central axis. The body has an outer surface and an inner surface defining an inner bore extending longitudinally through the body from a first open end of the body to a second open end of the body. The body is configured to be positioned at least partly in the drain tube. The inner surface of the bore has at least a tapered portion having a tapered inner sealing surface that is tapered longitudinally from a first diameter to a second diameter that is smaller than the first diameter. The valve also includes at least one external seal extending from the outer surface of the body. The external seal is configured to seal with the drain tube. Also, the valve includes a retaining member extending at least partially into the bore. The retaining member is spaced longitudinally from the second diameter. The valve also includes a buoyant sealing member disposed and retained between the second diameter and the retaining member. The sealing member is longitudinally displaceable in the bore between the second diameter and the retaining member and configured to seal with the tapered sealing surface in a valve closed, first configuration when the buoyant sealing member is at the second diameter and is configured to not seal with the tapered sealing surface in a valve open, second configuration when the buoyant sealing member is spaced from the second diameter. In the valve opened position, fluid is permitted to flow through the inner bore in a direction from the first open end to the second open end. In embodiments, the sealing member is a ball having a diameter that is greater than the second diameter of the tapered portion.

In embodiments, the body has a length that is less than a length of the drain tube. In embodiments, the tapered inner sealing surface is at least partially frustoconical and has a profile that is at least partially linearly tapered. In embodiments, the tapered inner sealing surface is at least partially toroidal and has a profile that is at least partially convex. The tapered inner sealing surface may have a taper of any profile, including linear, convex, and concave.

In embodiments, the tapered sealing surface may be part of an internal seal that is connected to the body in the bore. In embodiments, the internal seal is an o-ring having a circular cross sectional shape and a convex tapered sealing surface. The tapered portion may be seated in a circumferential groove defined in an inner surface that defines the inner bore of the body. For example, the o-ring may be seated in a circumferential groove so that an inner convex and tapered surface of the o-ring protrudes into the bore of the body to engage and seal with the buoyant sealing member in the first configuration.

In embodiments, the external seal has a tapered sealing surface that tapers along the longitudinal axis from a first diameter to a second diameter that is smaller than the first diameter. In embodiments, the external seal is seated in a circumferential groove formed in the outer surface of the body. For example, the external seal may be an o-ring having a tapered sealing surface and the o-ring may be seated in a circumferential groove formed in the outer surface of the body.

In embodiments, the tapered inner surface extends continuously from the first open end to the second open end of the body. For example, the inner bore of the body may be continuously tapered from the first to the second open ends. The continuous tapered sealing surface may have a taper of any profile (e.g., linear, convex, and concave) that is configured to seal with a sealing surface of the buoyant sealing member.

In embodiments, the body has an upper portion and a lower portion. The upper portion is formed as a flange having an outer diameter larger than an outer diameter of the lower portion. The valve may have a handle pivotally coupled to the upper portion of the body.

In embodiments, the first open end of the body is configured to be positioned in an interior compartment of the vessel. Alternatively, in embodiments, the first open end of the body is configured to be positioned in the drain tube.

In embodiments, the body defines at least one aperture extending through a wall of the body between a first end of the aperture at a longitudinal position above an upper end of the drain tube to a second end of the aperture that is below the upper end of the drain tube and above the at least one inner seal. In embodiments, the first end of the aperture is at the outer surface of the body and the second end of the aperture is at the inner annular surface of the body.

In embodiments, the first open end defines an inlet opening and the second open end defines an outlet opening, wherein the inlet and outlet opening are coaxially aligned along the longitudinal axis.

According to another aspect, a method of installing a marine drain valve in a marine drain tube that extends through a wall of a marine vessel includes providing a valve as described above, and introducing the second end of the body of the valve into the drain tube and sealing the at least one external seal with the drain tube.

In embodiments, the first end of the body is configured to be positioned in an interior compartment of the vessel and wherein introducing the second end of the body includes positioning the first end of the body in an interior compartment of the vessel. In embodiments, introducing the second end of the body includes positioning the first end of the body in either an interior compartment of the vessel, flush with an inner end of the drain tube, or below the inner end of the drain tube.

According to one aspect, further details of which are provided herein, a marine drain valve for use with a marine drain tube that extends through a wall of a marine vessel includes a body extending along a central axis. The body has a cylindrical outer surface and has a cylindrical inner surface defining a bore extending longitudinally through the body from a first end of the body that may be configured to be positioned in an interior compartment of the vessel, to a second end of the body that is configured to be positioned in the drain tube. The body has a length that is less than a length of the drain tube, and the elongated body is configured for placement partly within the drain tube.

The valve also includes at least one external seal extending from the cylindrical outer surface of the body, at least one internal seal extending from the inner cylindrical surface into the bore, a sealing member disposed within the bore, and a retaining member retaining the sealing member in the bore between the at least one internal seal and the retaining member. The sealing member is longitudinally displaceable in the bore between the at least one internal seal and the retaining member and is configured to seal with the at least one internal seal in a first configuration in which the valve is closed and is configured to not seal with the at least one internal seal in a second configuration in which the valve is open.

In one embodiment the outer cylindrical surface defines at least one circumferential groove and the at least one external seal includes an o-ring that is seated in a corresponding circumferential groove. The inner cylindrical surface may define at least one circumferential groove and the at least one internal seal includes an o-ring that is seated in a corresponding circumferential groove. The outer cylindrical surface may define a plurality of circumferential grooves spaced longitudinally from each other, and each circumferential groove may have an inner diameter different from each other. Also, the inner diameters may increase in the axial direction from the second end to the first end. The outer diameters of the o-ring seals seated in the corresponding circumferential grooves increase in the axial direction from the second end to the first end.

In one embodiment, the sealing member is a buoyant member. The sealing member may be a ball or sphere. In one embodiment, the sealing member is retained in the bore between the at least one internal seal and the retaining member. In one embodiment, the retaining member extends diametrically across the bore.

In one embodiment, the body may have an upper portion and a lower portion. The upper portion may be formed as a flange having an outer diameter larger than an outer diameter of the lower portion. The valve may also include a handle coupled to the upper portion of the body.

According to another aspect, further details of which are described herein, a method of installing a marine drain valve in a marine drain tube that extends through a wall of a marine vessel includes providing an afore-mentioned drain valve and introducing the second end of the body of the valve into the drain tube and sealing the at least one external seal with the drain tube.

BRIEF DESCRIPTION OF THE DRAWINGS

FIG. 10A shows an isometric view of another embodiment of a drain valve.
FIG. 10B shows an isometric view of the drain valve of FIG. 10A with internal and external seals and handle of the valve omitted.
FIG. 10C shows a side elevation view of the drain valve of FIG. 10B.

DETAILED DESCRIPTION

Figure 4:
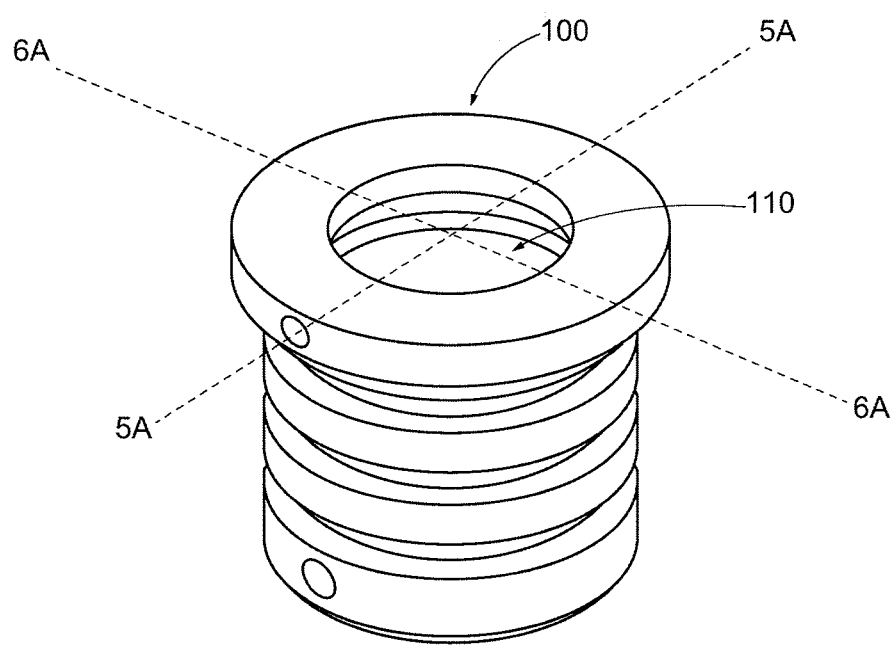
FIG. 4 shows an isometric view of a drain valve with internal and external seals of the valve omitted.

FIG. 4 shows an embodiment of a drain valve 100, shown with internal and external seals omitted, in accordance with the disclosure. The valve 100 is configured to substitute for the aforementioned prior art bailer drain plugs 2 and 3 that fit into dedicated drain tubes 1 that are manufactured into boats. Thus, the valve 100 described herein may simply be used in the drain tube 1 in the place of prior art bailer drain plugs 2 or 3 without requiring a user to drill any new holes in the boat for placement of the valve 100.

Figure 1A:
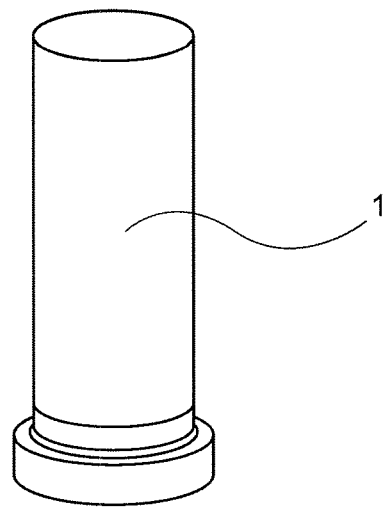
FIG. 1A shows a prior art marine drain tube.
Figure 5A:
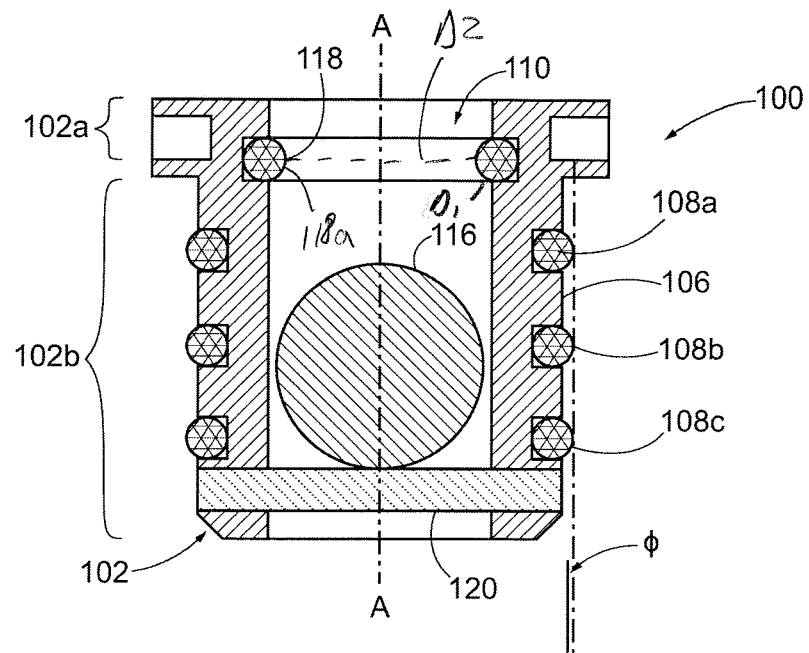
FIG. 5A shows a view of the valve, including the valve body of FIG. 4 along section 5A-5A, shown with internal and external seals. The valve is shown in a valve open configuration.
Figure 5B:
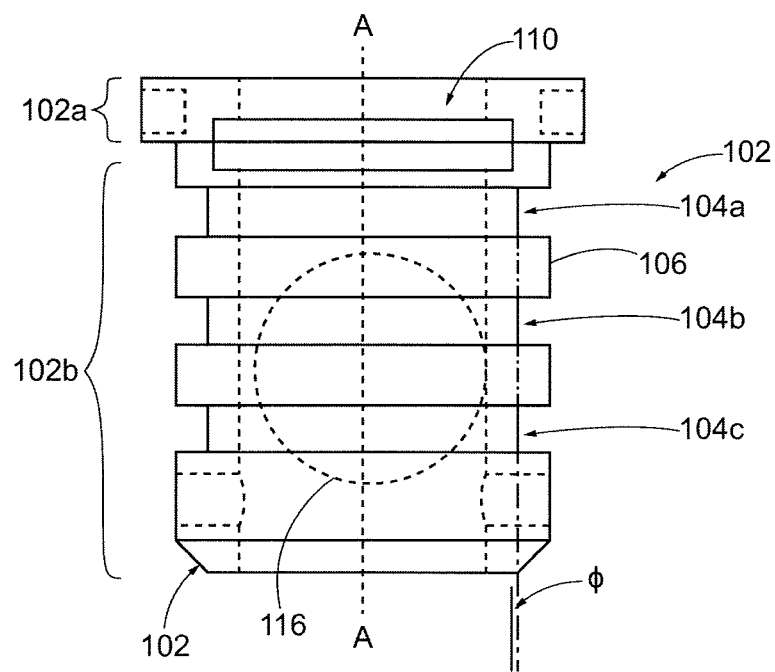
FIG. 5B shows a side elevation view of the body of the valve of FIG. 4. The valve is shown in a valve open configuration.
Figure 5C:
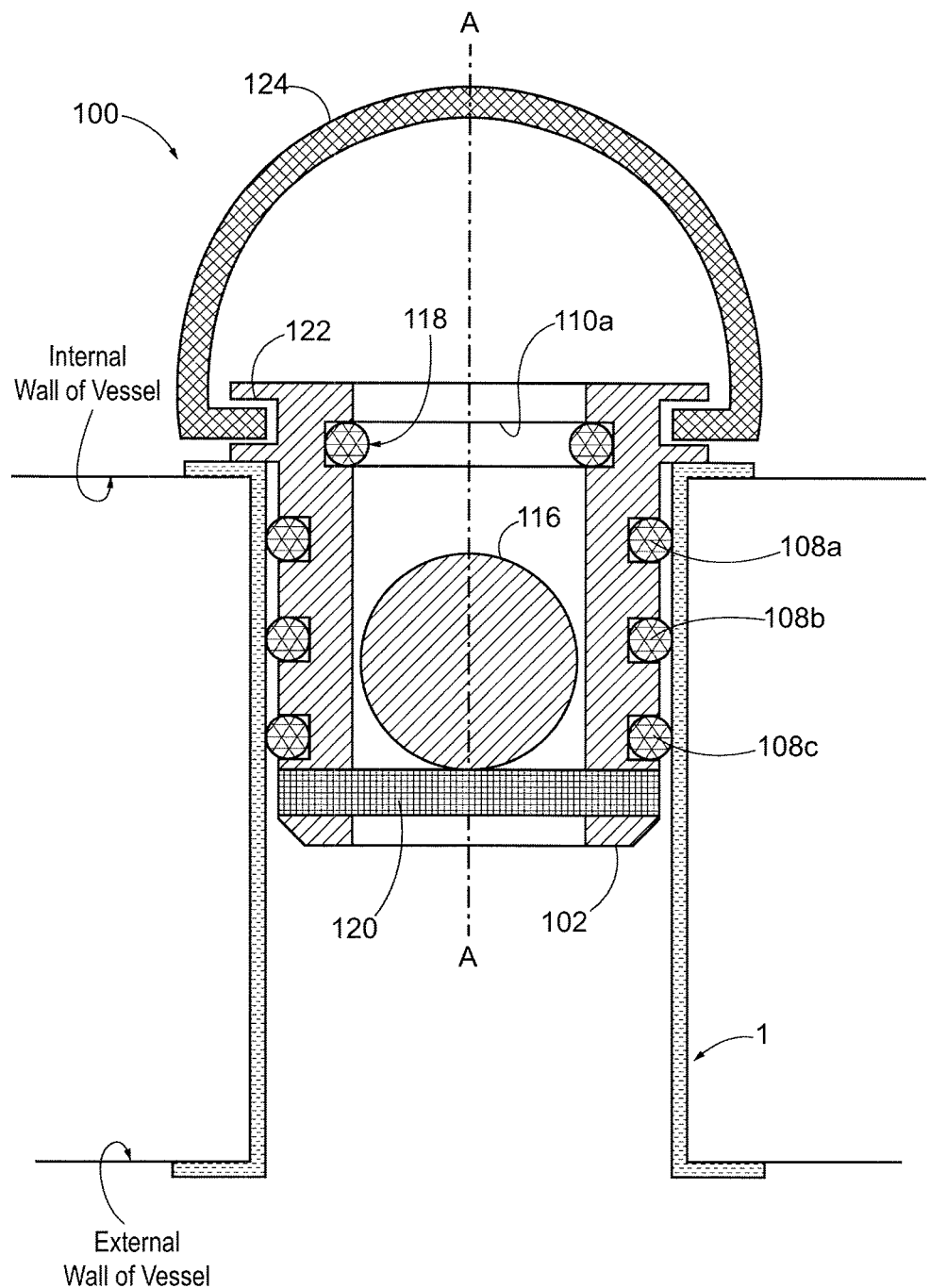
FIG. 5C shows the valve of FIG. 5A in a seated and fully installed configuration in a drain tube of a marine vessel.
Figure 6A:
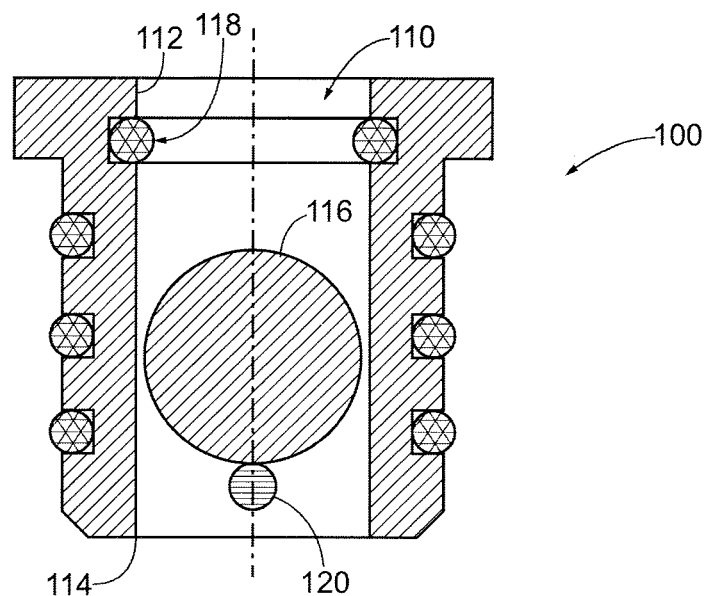
FIG. 6A shows a view of the valve, including the valve body of FIG. 4 along section 6A-6A, shown with internal and external seals. The valve is shown in a valve open configuration.
Figure 6B:
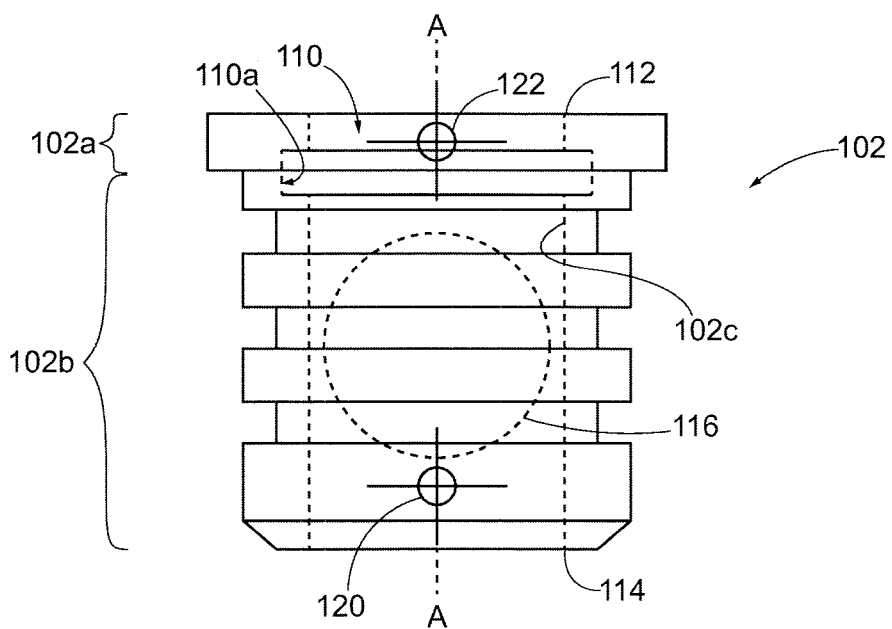
FIG. 6B shows a side elevation view of the body of FIG. 4 rotated ninety degrees from the view of FIG. 5B. The valve is shown in a valve open configuration.
Figure 7:
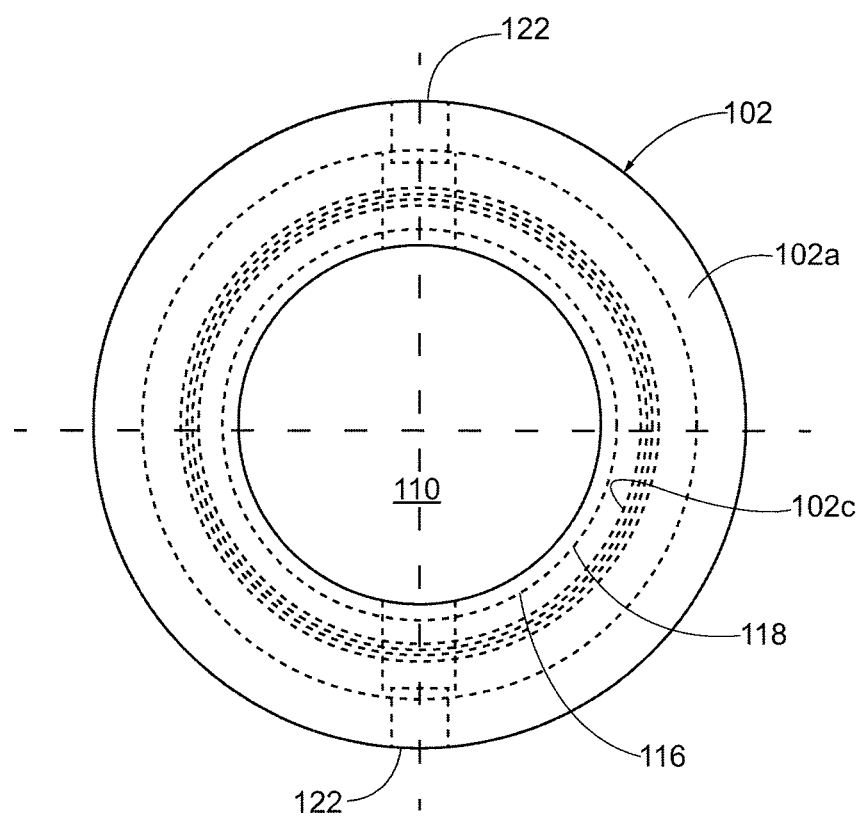
FIG. 7 shows a top plan view of the body shown in FIG. 4.

The valve 100 includes a body 102, shown in greater detail in FIGS. 5B, 6B, and 7B, which is configured generally as a plug to be received in the drain tube 1 in one configuration, such as the drain tube 1 shown in FIG. 1A. In a configuration where the body 102 is seated in the drain tube, a leak tight seal is formed between the valve 100 and the drain tube 1 so that fluid may only pass selectively through a bore 110 (FIGS. 4 to 7) of the body 102, as described in greater detail herein.

Turning to FIGS. 5A and 5B, the body 102 has an upper portion 102a and a lower portion 102b. The lower portion 102b of the valve 100 is configured to be received in and seal with an inner wall of the drain tube when the valve 100 is seated in the drain tube. The upper portion 102a is formed as a flange that is configured to either remain spaced from or engage the rolled flange 1a of the drain tube 1 in the configuration where the valve 100 is fully seated in the drain tube 1, as shown in FIG. 5C. Thus, the upper portion 102a acts as a positive stop limiting how far down into the drain tube the valve 100 can be located by a user.

The lower portion 102b of the body 102 has an outer cylindrical surface 106 that defines one or more circumferential grooves 104a, 104b, and 104c (FIG. 5B) that receive annular seals, such as o-ring seals 108a, 108b, and 108c (FIG. 5A). In one embodiment, the thickness (measured in the axial direction A-A in FIG. 5B) of each circumferential groove is 0.110 inch, and the spacing between the grooves is 0.140 inch. However, the dimensions of each respective circumferential groove may be different to achieve desired sealing results. In the embodiment shown in FIG. 5B, the diameters of the circumferential grooves 104a, 104b, and 104c are staggered so that the diameter of groove 104a is smaller than the diameter of groove 104b, which is smaller than the diameter of groove 104c. When the seals 108a, 108b, and 108c are seated in their corresponding grooves 104a, 104b, and 104c, as shown in FIG. 5A, the outer diameters of the seals 108a, 108b, and 108c are also staggered from each other such that a line tangent to each seal is angled at a sealing taper angle φ with respect to a vertical axis A-A through the center of the valve 100. This sealing taper may improve the sealing and retention of the valve 102 in the drain tube 1. In another embodiment, the grooves 104a, 104b, and 104c (FIG. 5B) and seals 108a, 108b, and 108c are not staggered, and may instead by aligned along axis A-A and have the same diameter.

Turning to FIG. 6B, the body 102 has an inner annular wall 102c that defines the bore 110 that extends axially along axis A-A from an upper end 112 to a lower end 114 of the body 102. The bore 110 may be coaxial with the upper and lower portions 102a and 102b of the body 102. As shown in FIG. 6A, a buoyant ball 116 is located in the bore 110. The bore 110 has a diameter that is generally of constant dimension along axis A-A, with the exception of a cylindrical groove 110a located between the upper and lower ends 112, 114 of the body 102. As shown in FIG. 5C, the cylindrical groove 110a is in the upper portion 102a, though, in other embodiments, the groove 110a may be in the lower portion 102b. The ball 116 has a diameter that is smaller than the diameter of the bore 110 so that the ball 116 may move freely in the bore 110. The cylindrical groove 110a is configured to receive an annular (e.g., o-ring) seal 118 (FIG. 6A) having an inner diameter that is smaller than the diameter of the bore 110 and smaller than the diameter of the ball 116, which is located below the seal 118 in the bore 110. Thus, the o-ring 118 intrudes into the bore 110 to block the upward passage of the ball 116 through the bore 110. Specifically, the o-ring seal 118 is configured to seal against the ball 116 in one configuration, further details of which are described herein.

The specific type of annular seal 118 shown in FIG. 5A is an o-ring having a circular cross section. At least a lower portion (e.g., bottom half) of the protruding surface 118a of the o-ring 118 tapers along axis A-A in FIG. 5A from a first, larger diameter D1 to a second, smaller diameter D2. Thus, the inner bore 110 has at least one tapered inner sealing surface, along a portion the axial length of the bore 110, that is configured to seal with the sealing member, e.g., ball 116, as described herein. Also, it will be appreciated that while in embodiments the seal 118 is a separate part that is connected by seating in the groove 110a formed in the body 102, in other embodiments, the seal 118 and body 102 may be integrally formed, such as by molding them from the same material, such as rubber, plastic, or silicone.

While the annular seal 118 shown in FIG. 5A is an o-ring having a circular cross-section, it will be appreciated that other annular seals or o-ring seals having other tapered cross sections may be used with the body 102, such as annular seals having a cross section that is triangular or beveled with a linear tapered surface, such as that shown in FIGS. 11D to 11F, further details of which are described hereinbelow.

A retaining member 120 extends diametrically across the bore 110 below the ball 112. In an embodiment, the retaining member 120 may be a pin or rod-like member assembled with the body 102 or integrally formed therewith. The retaining member can alternatively be a reduced diameter lip positioned at the lower end 114 of the bore 110. The retaining member 120 is fixed with respect to the inner wall 102c of the body 102. When the o-ring seal 118 is located in the cylindrical groove 110a and the retaining member is present, the ball 116 is captured within the bore 110 so that the ball 116 has a range of motion between the o-ring seal 118 and the retaining member 120.

Figure 1B:
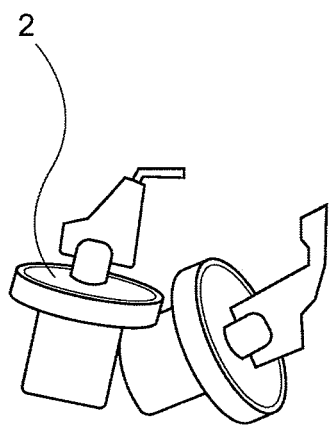
FIG. 1B shows a prior art bailer plug.
Figure 1C:
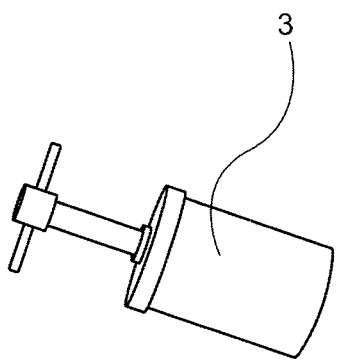
FIG. 1C shows another prior art bailer plug.
Figure 2:
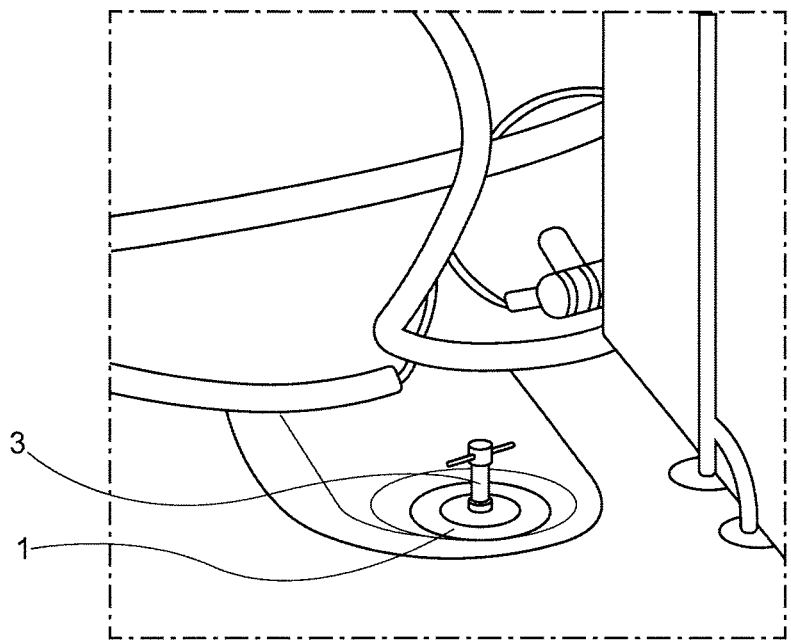
FIG. 2 shows a portion of a prior art interior compartment of a boat partially filled with water and the prior art drain plug of FIG. 1C sealed in a drain tube.
Figure 3:
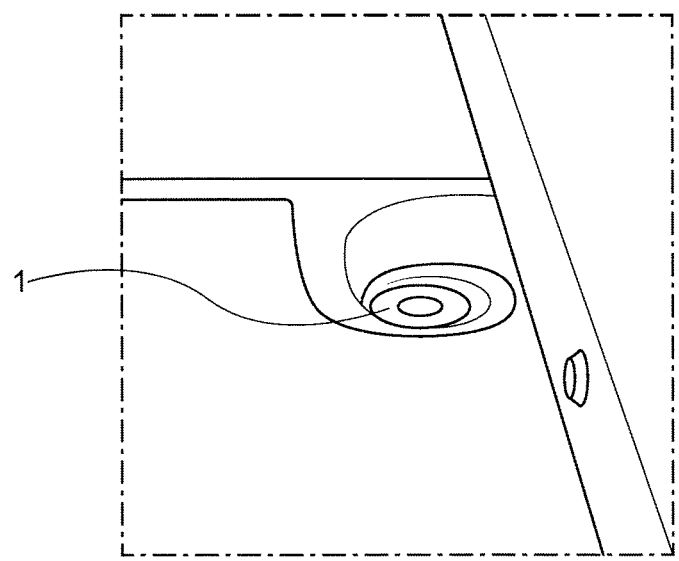
FIG. 3 shows the portion of the prior art interior compartment of the boat of FIG. 2 with the prior art drain plug removed.

The valve 100 may be used as follows for a boat configured with the drain tube 1. When a boat in which the drain tube is installed is out of the water, any existing bailer plug (e.g., plug 2 or 3, FIGS. 1B, 1C) is removed from the drain tube as shown in FIG. 3. The valve 100 is oriented so that the lower end 114 is oriented down and the upper end 112 is oriented above the lower end 114 so that the lower end 102b is facing the drain tube 1. The lower portion 102b of the valve 100 is introduced into the drain tube 1 and pushed until it is firmly in place or until the underside of the flange of the upper portion 102a contacts the flange 1a of the drain tube 1. When so placed, the valve 100 is in a fully seated configuration in the drain tube 1.

In the fully seated configuration of the valve 100, the upper end 112 of the bore 110 is in fluid communication with the interior compartment of the boat and the lower end 114 of the bore 110 is in fluid communication with the exterior of the boat. The interior compartment and the exterior of the boat may come into fluid communication through the bore 110 of the body 102 of the valve 100 when the valve 100 is in an open configuration, as shown in FIGS. 5A to 6B.

The ball 116 is configured to be axially displaceable in response to varying buoyancy forces applied to the ball 116 resulting from the net differential pressure applied to the ball 116 from water above and below the ball in the bore 110, if any. The buoyancy forces can change as a result of water level changes in the bore 110 during operation of the boat. For example, when the boat is on a trailer and out of the body of water in which it may be used, there will be no buoyancy forces acting on the ball 116 and the weight of the ball (as well as the downward force from any water in the interior compartment of the boat acting on the ball 116) will urge the ball 116 downward into contact with the retaining member 120, as shown in FIGS. 5A to 6B, which shows the valve 100 in an open configuration. When in the open configuration, any water above the valve can flow down the bore 110 from the interior compartment to the outside of the boat. When the boat is returned to the water after the water from the interior compartment is drained, such as when a user launches the boat from a trailer into the water, the only downward force on the ball 116 is its weight. Eventually, as users enter the boat the level of the drain 1 is lowered into the water until the water level in the drain tube and in the bore 110 rises causing the buoyant ball 116 eventually to float and rise towards the o-ring seal 118. If the water level rises sufficiently, the ball 116 engages the o-ring seal 118, and specifically the tapered sealing surface 118a, and the buoyant forces acting on the ball from the water pressure below the ball 116 causes the ball 116 to seal with the o-ring seal 118, configuring the valve 100 in a closed configuration that prevents fluid flow from the outside of the boat into the interior compartment (and vice versa). Accordingly, in the closed configuration, the valve 100 is checked in a direction from the exterior of the boat to the interior of the boat. When the boat is moving and is underway, the water level in the drain tube falls due to the drain tube rising out of the water and the ball 116 to unseal with the o-ring seal 118, permitting any fluid in the inner compartment of the boat to drain through the bore 110 and out of the drain tube 1.

The body 102 of the valve 100 may be made from various materials. In one embodiment, the body 100 is made from rubber and may be molded. The retaining member 120 may also be made from rubber and may be integrally molded with the rubber body 102. In one embodiment, the body 102 may be made from plastic and may be molded. Such plastics may include PVC, and PVDF, and the retaining member 120 may be integrally formed with the body out of plastic or may be made of metal and formed as a separate pin and assembled to the plastic body. The seals 108a, 108b, and 108c may be formed of various elastic materials, such as butadiene rubber, butyl rubber, chlorosulfonated polyethylene, epichlorohydrin rubber, ethylene propylene diene monomer, ethylene propylene rubber, fluoroelastomer, nitrile rubber, silicone rubber, perfluoroelastomer, polyacrylate rubber, neoprene, polyisoprene, polysulfide rubber, polytetrafluoroethylene, sanifluor, and styrene-butadiene rubber.

To facilitate installation and removal of the valve from the drain tube, a handle 124, shown in FIG. 5C, may be coupled to the upper portion 102a by holes 122 formed therein. The handle 124 may be a curved piece of metal or plastic and may be rotatable about holes 122 so that it can fold flush with the upper portion 102a (e.g., perpendicular to the position shown in FIG. 5C).

FIGS. 8A to 8E show features of another embodiment of a drain valve 200. In FIGS. 8A to 8E, elements corresponding to those of drain valve 100 are incremented by "100". The drain valve 200 includes a body 202 having an upper portion 202a and a lower portion 202b. The body 202 defines a longitudinally extending through-bore 210 that extends through the upper and lower portions 202a and 202b. The body 202 has an upper end 212 and a lower end 214. A foldable handle 224 is coupled to the upper portion 202a of the body 202.

Figure 8A:
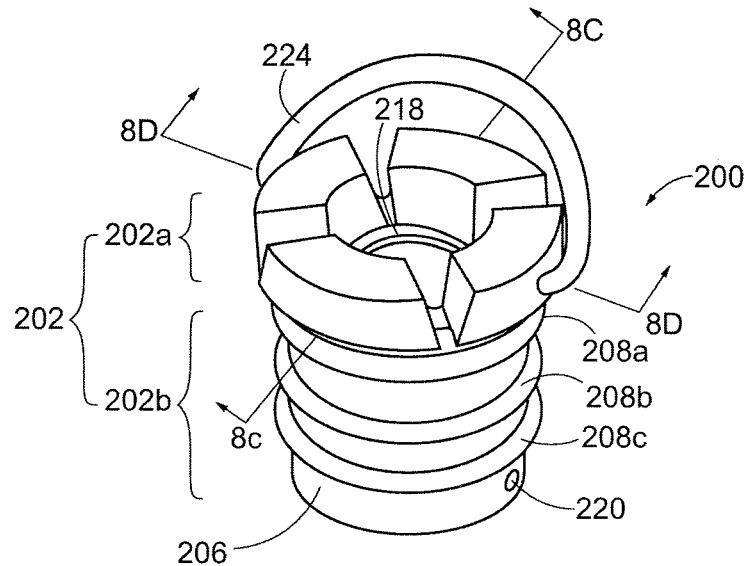
FIG. 8A shows an isometric view of an alternate embodiment of a drain valve.
Figure 8B:
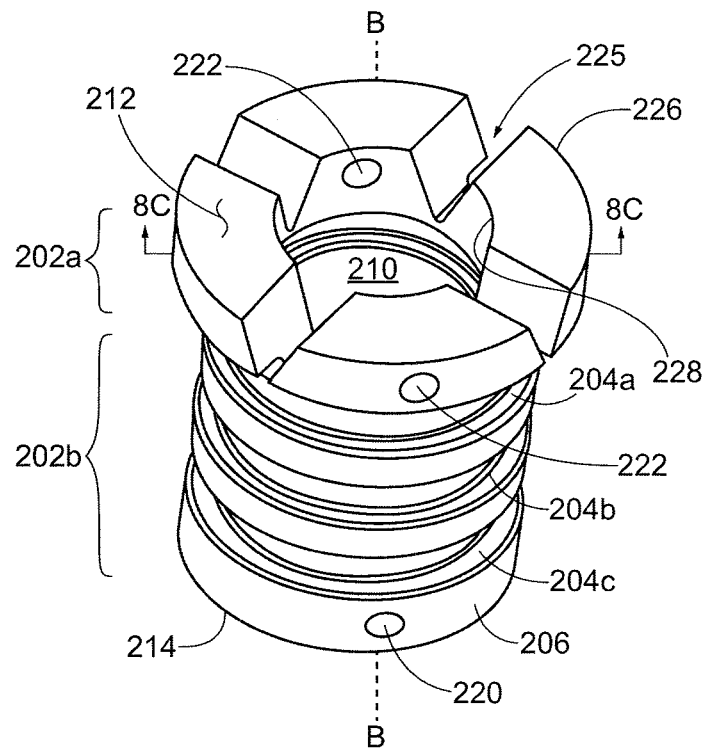
FIG. 8B shows the drain valve of FIG. 8A with internal seals, external seals, and handle of the valve shown in FIG. 8A omitted.

The lower portion 202b of the body 202 may be configured similarly to the lower portion 102a of valve 100. For example, the lower portion 202b of the body 202 has an outer cylindrical surface 206 that defines one or more circumferential grooves 204a, 204b, and 204c (FIGS. 8B and 8C) that receive corresponding o-ring seals 208a, 208b, and 208c (FIG. 8A). In one embodiment, the thickness (measured in the axial direction B-B in FIG. 8B) of each circumferential groove is 0.110 inch, and the spacing between the grooves is 0.140 inch. However, the dimensions of each respective circumferential groove may be different to achieve desired sealing results. In the embodiment shown in FIG. 8C, the diameters of the circumferential grooves 204a, 204b, and 204c are staggered so that the diameter of groove 204a is smaller than the diameter of groove 204b, which is smaller than the diameter of groove 204c. When the seals 208a, 208b, and 208c are seated in their corresponding grooves 204a, 204b, and 204c, as shown in FIG. 8A, the outer diameters of the seals 208a, 208b, and 208c are also staggered from each other, which may improve the sealing and retention of the valve 202 in the drain tube 1. In another embodiment, the grooves 204a, 204b, and 204c and seals 208a, 208b, and 208c are not staggered, and may instead by aligned along axis B-B and have the same diameter.

The valve 200 also includes a retaining member 220 (FIGS. 8A and 8C) that extends into the bore 210 to retain a ball 216 (FIGS. 8C, 8D, 8E) that is in the bore 210. The body 202 also defines a cylindrical bore 210a that receives an o-ring seal 218 (FIGS. 8A and 8E) to seal with the ball 216 in the bore and to retain the ball 216 between the retaining member 220 and the o-ring seal 218. The movement of the ball 216 and the operation thereof in draining water from the boat is identical to that described hereinabove for ball 116 in connection with valve 100 and is not repeated here for the sake of brevity.

The valve 200 can be installed in the drain tube 1 in the same manner described herein for valve 100 and as shown in FIG. 5C. In that regard, with momentary reference to FIG. 5C, it will be appreciated that when the water level surrounding the upper portion 102a is at or below the top of the upper portion 102a, the water cannot flow into the bore 110. Thus, puddling around the upper portion 102a may occur even after the flow of water through the valve 100 ceases.

Figure 8C:
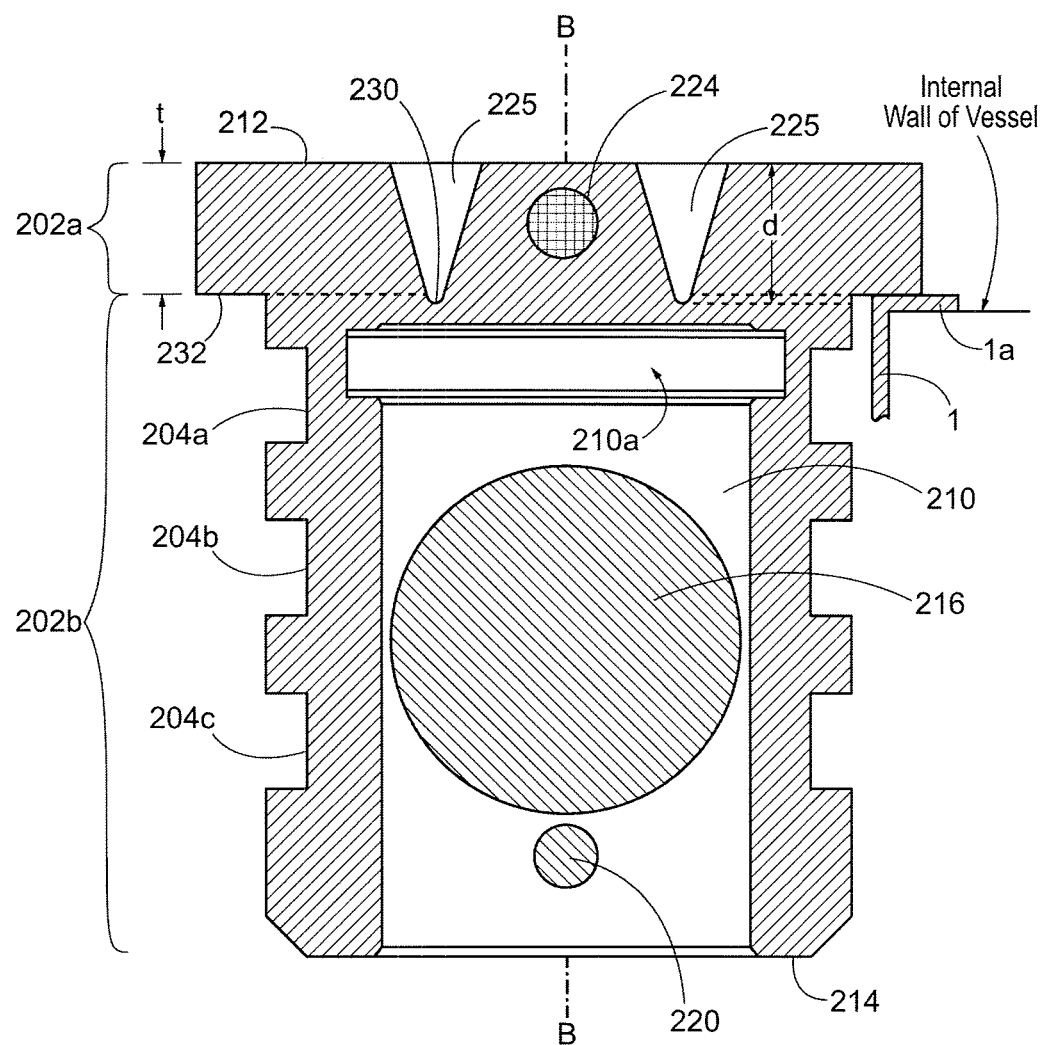
FIG. 8C shows the drain valve of FIG. 8A along section 8C-8C in FIG. 8A, with the internal and external seals of the drain valve omitted for clarity.
Figure 8D:
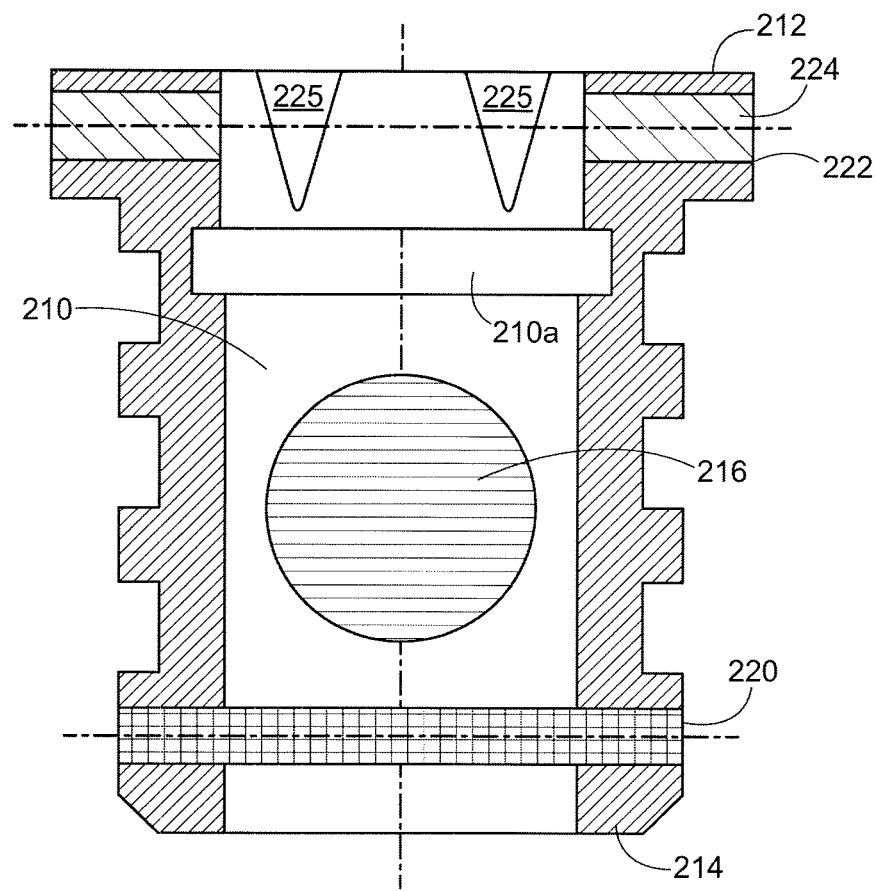
FIG. 8D shows the drain valve of FIG. 8A along section 8D-8D in FIG. 8A, with the internal and external seals of the drain valve omitted for clarity.

One notable difference between valve 100 and valve 200 is the configuration of the upper portion 202a of valve 200, which defines at least one groove or aperture 225 (FIGS. 8B to 8E), which is configured to direct fluid that is below the upper end 212 of the body to drain into the bore 210 and through the drain tube 1. Also, the cylindrical bore 210a that receives o-ring seal 218 may be located in the lower portion 202b at a depth below the groove or aperture 225. This can accommodate a depth "d" (FIG. 8C) of groove 225 that is at or below the level of the flange 1a of the drain tube 1 (or below the internal wall of the vessel) when the valve 200 is fully seated in the drain tube. When so configured, the groove 225 can mitigate puddling of water around the upper portion 202a and direct such water surrounding the upper portion 202a through the groove 225 into the bore 210 and then out of the drain tube 1 when the valve 200 is installed in the drain tube 1, as shown in FIG. 8C.

Figure 8E:
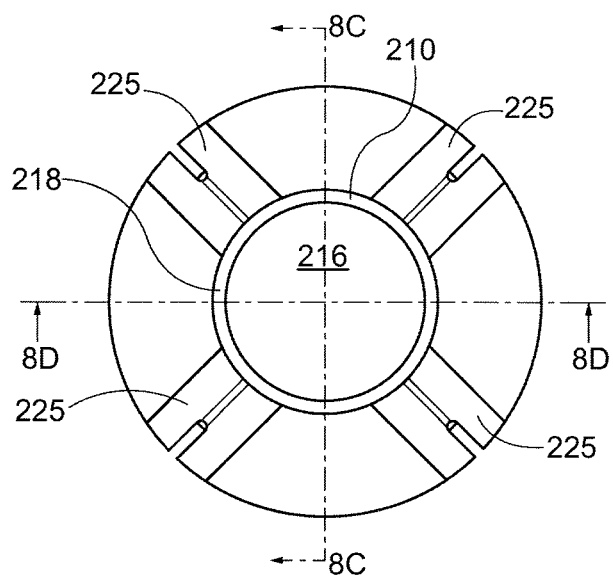
FIG. 8E shows a top view of the drain valve of FIG. 8A.

In the embodiment of the valve 200 shown in FIGS. 8A to 8E, four grooves 225 are defined in the upper portion 202a. As shown in FIG. 8E, the grooves 225 are circumferentially spaced about ninety degrees from each other. Each groove 225 is "V" shaped, although they may have other shapes, such as "U" shaped. Also, instead of a groove with an opening to the upper end 212 of the body 202, radially directed bore holes may be formed in the upper portion 202a below the upper end 212.

In the embodiment shown in FIGS. 8A to 8E, each groove 225 extends radially from an outer side 226 of the upper portion 202a to an inner side 228 of the upper portion 202a. In at least one embodiment, the groove has a depth "d" from the upper surface 224 to a base 230. The depth "d" may be larger than the thickness "t" (FIG. 8C) of the upper portion 202a between the upper surface 224 and a lower surface 232 of the upper portion 202a. In embodiments, the depth "d" may extend longitudinally as far as an upper side of cylindrical groove 210a. Thus, in at least one embodiment shown in FIGS. 8A to 8E, the groove 225 may extend in the longitudinal direction completely through the upper portion 202a and partially through the lower portion 202b. Also, the depth "d" may not be uniform from the outer side 226 to the inner side 228, but may instead vary with radial distance. For example, in one embodiment, the depth "d" may increase towards the inner side 228.

The upper portion 202a of the body 202 has an outer diameter that is larger than the outer diameter of the lower portion 202b of the body 202. The upper portion 202a can thus act as a flange that can either remain spaced from or engage the rolled flange 1a of the drain tube 1 in the configuration where the valve 200 is fully seated in the drain tube 1, as shown in FIG. 8C. Thus, the upper portion 202a can act as a positive stop limiting how far down into the drain tube 1 the valve 200 can be located by a user.

FIGS. 9A to 9E show features of another embodiment of a drain valve 300. The drain valve 300 has features that correspond to those of drain valve 100, but which are noted with reference numbers that are incremented by "200".

Figures 9A, 9B:
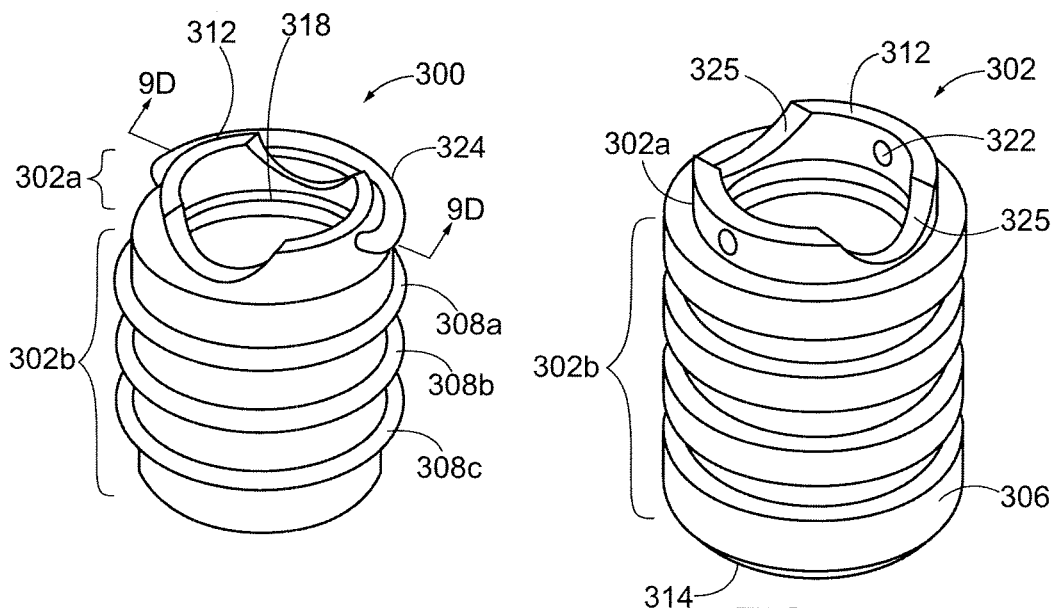
FIG. 9A shows an isometric view of another embodiment of a drain valve.
FIG. 9B shows an isometric view of the drain valve of FIG. 9A with internal seals, external seals, and handle of the valve omitted.
Figure 9C:
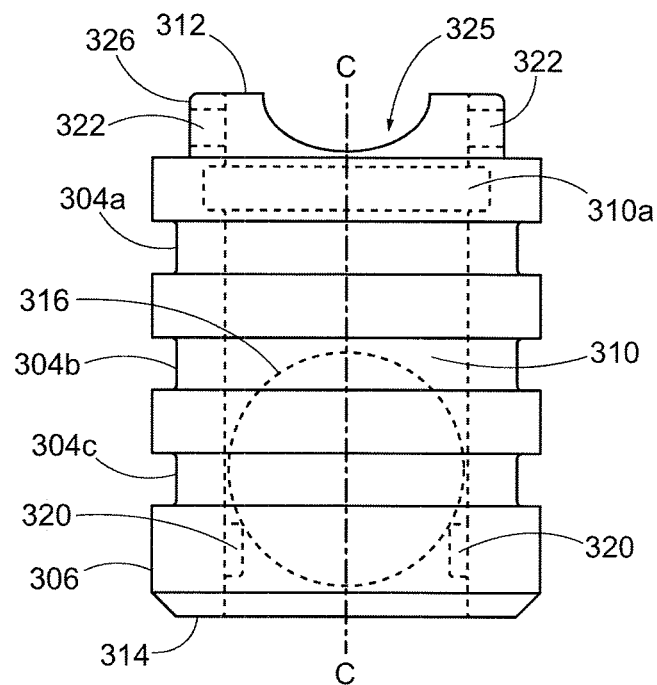
FIG. 9C shows a side elevation view of the drain valve of FIG. 9B.
Figure 9D:
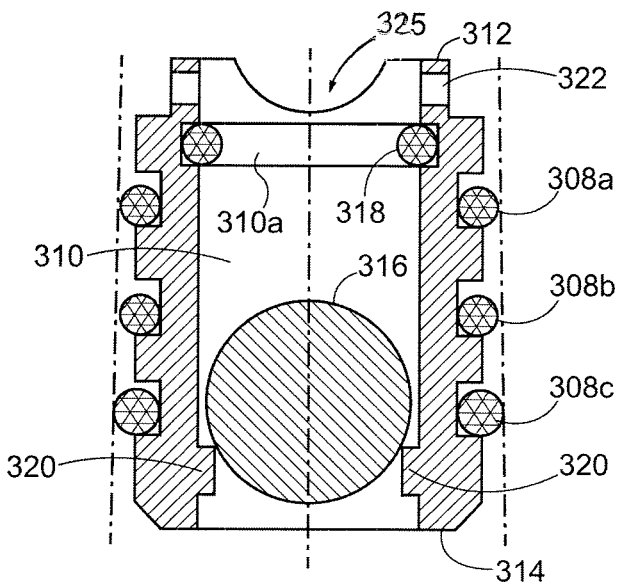
FIG. 9D shows a view of the drain valve of FIG. 9A, without the handle, through a section 9D-9D in FIG. 9A.

The drain valve 300 includes a body 302 having an upper portion 302a and a lower portion 302b. The body 302 defines a longitudinally extending through-bore 310. The body 302 extends from an upper end 312 (FIGS. 9B to 9D) to a lower end 314 (FIGS. 9B to 9D). A foldable handle 324 (FIGS. 9A and 9E) is coupled to the upper portion 302a of the body 302.

The lower portion 302b of the body 302 may be configured in the same manner as the lower portion 102a of valve 100. For example, the lower portion 302b of the body 302 has an outer cylindrical surface 306 (FIGS. 9B and 9C) that defines one or more circumferential grooves 304a, 304b, and 304c (FIG. 9C) that receive corresponding o-ring seals 308a, 308b, and 308c (FIGS. 9A and 9D). In one embodiment, the thickness (measured in the axial direction C-C in FIG. 9C) of each circumferential groove is 0.110 inch, and the spacing between the grooves is 0.140 inch. However, the dimensions of each respective circumferential groove may be different to achieve desired sealing results. In the embodiment shown in FIG. 9C, the diameters of the circumferential grooves 304a, 304b, and 304c are staggered so that the diameter of groove 304a is smaller than the diameter of groove 304b, which is smaller than the diameter of groove 304c. When the seals 308a, 308b, and 308c are seated in their corresponding grooves 304a, 304b, and 304c, as shown in FIG. 9D, the outer diameters of the seals 308a, 308b, and 308c are also staggered from each other, which may improve the sealing and retention of the valve 302 in the drain tube 1. In another embodiment, the grooves 304a, 304b, and 304c and seals 308a, 308b, and 308c are not staggered, and may instead by aligned along axis C-C and have the same diameter.

The valve 300 may also include at least one retaining member 320 (FIGS. 9D and 9E) that extends into the bore 310 to retain a ball 316 that is in the bore 310. The body 302 also defines a cylindrical bore 310a that receives an o-ring seal 318 (FIGS. 9A, 9D, and 9E) that seals with the ball 316 and retains the ball 316 in the bore 310 between the retaining member 320 and the o-ring seal 318. The movement of the ball 316 and the operation thereof in draining water from the boat is identical to that described hereainabove for ball 116 in connection with valve 100 and is not repeated here for the sake of brevity.

Unlike the upper portions 102a and 202a of drain valves 100 and 200, the outer diameter of the upper portion 302a of body 302 of valve 300 is not larger than the outer diameter of the lower portion 302b. Thus, the upper portion 302a is not formed as a flange that can act as a positive stop when the valve 300 is seated in drain tube 1. Instead, valve 300 is configured so that the upper end 312 of the body 302 can be located above, flush with, or slightly recessed below the flange 1a of the drain tube 1 when the valve 300 is seated in the drain tube 1.

The upper portion 302a of the body 302 has an outer side surface 326 (FIG. 9C) that has a diameter that is less than (or equal to) the diameter of the outer surface 306 of the lower portion 302b of the body 302. As shown in FIG. 9A, the outer side surface 326 is radially offset from the outer surface 306 forming an annular shoulder so that the handle 324 can be folded flush with or below the upper end 312 of the body 302.

Figure 9E:
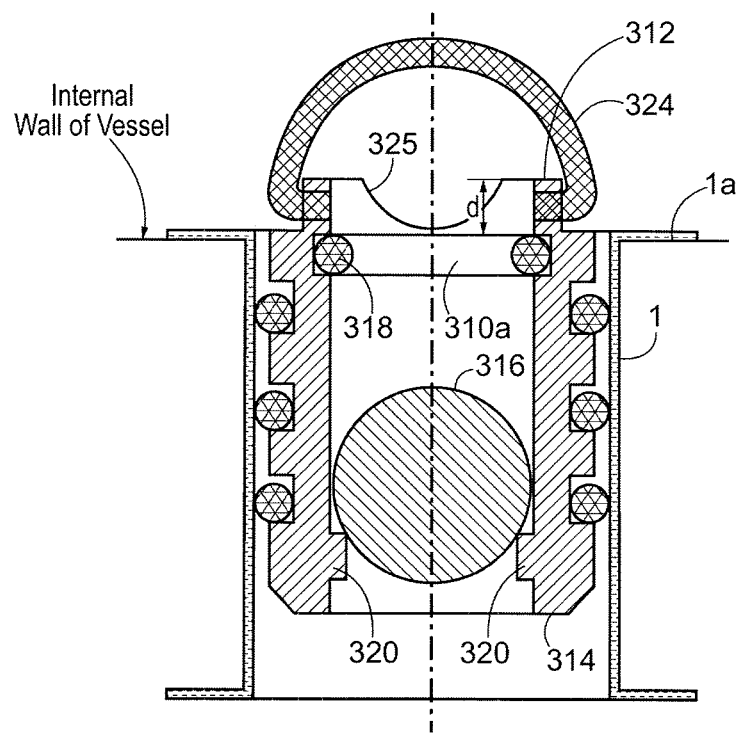
FIG. 9E shows a view of the drain valve of FIG. 9D, with the handle, sealed in a drain tube.
Figure 10D:
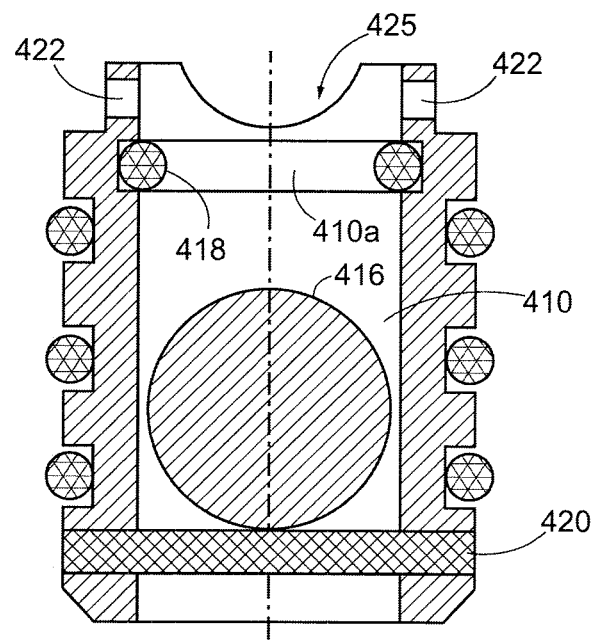
FIG. 10D shows a view of the drain valve of FIG. 10A, without the handle, through a section 10D-10D in FIG. 10A.
Figure 10E:
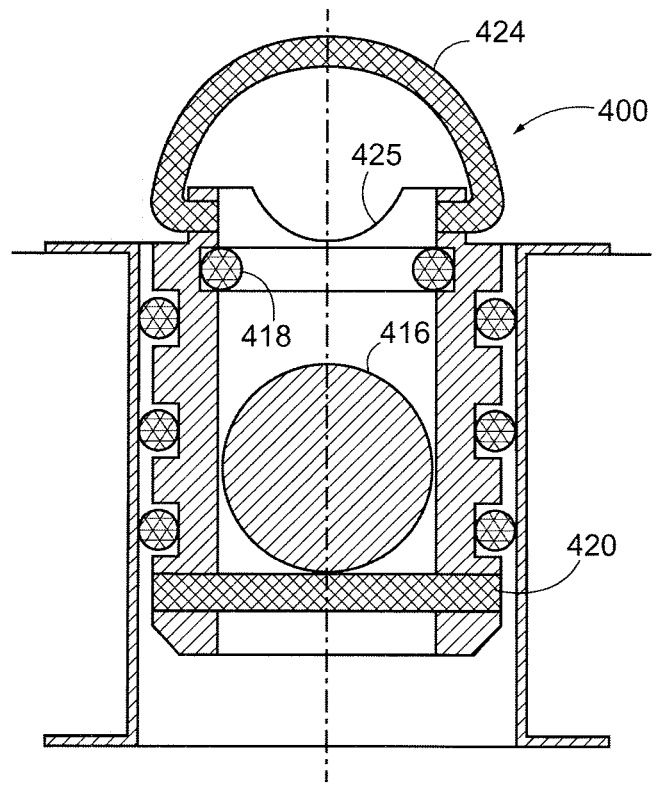
FIG. 10E shows a view of the drain valve of FIG. 10D, with the handle, sealed in a drain tube.

Also, as shown in FIGS. 9C to 9E, the valve 300 includes a retaining member 320 in the form of at least one projection 320 in the bore 310 of the body 302. Two projections are shown in FIG. 9C to 9E. The projections 320 do not extend completely across the horizontal direction of the bore 310 in FIGS. 9C to 9E. The projections 320 may be integrally formed with the body 302, such as by injection molding, or may be separately assembled elements, such as pins. The projections 320 function in the same manner as pin or rod-like member 120 of valve 100 to support a ball 316 when water is draining out of the boat through the valve 300.

The upper portion 302a of the body 300 defines at least one groove or aperture 325, which is configured to direct fluid that is below the upper end 312 of the body 302 to drain into the bore 310 and through the drain tube 1. Also, the cylindrical bore 310a that receives o-ring seal 318 may be located in the lower portion 302b at a depth below the groove or aperture 325 to accommodate a depth "d" of groove 325 that is at or below the level of the flange 1a of the drain tube 1 or the internal wall of the vessel when the valve 300 is fully seated in the drain tube 1. When so configured, the groove 325 can mitigate puddling of water around the upper portion 302a of the body 302 and direct such water surrounding the upper portion 302a through the groove 325 into the bore 310 and then out of the drain tube 1 when the valve 300 is installed in the drain tube 1, as shown in FIG. 9E.

In the embodiment of the valve 300 shown in FIGS. 9A and 9B two grooves 325 are defined in the upper portion 302a. The grooves 325 are diametrically opposite each other, although such a configuration is not required. Each groove 325 is "c" shaped, although they may have other shapes, such as "V" shaped and "U" shaped. Also, instead of a groove that is open to the upper end 312, radially directed bore holes may be formed in the sides of the upper portion 302a below the upper end 312 and above the cylindrical groove 310a. It will be appreciated that the grooves 325 also may provide access for a user to insert a finger to raise the handle 324 from the folded position shown in FIG. 9A.

FIGS. 10A to 10E show features of another embodiment of a drain valve 400. In FIGS. 10A to 10E, elements corresponding to valve 100 are incremented by "300". Drain valve 400 is identical to drain valve 300 with the exception that a rod 420 substitutes for the projections 320 as a retaining member. Otherwise, the operation of valve 400 is identical to valve 300.

FIGS. 11A to 11G show features of another embodiment of a drain valve 500, having features similar to those of drain valve 200. In FIGS. 11A to 11G, elements corresponding to those of drain valve 200 are incremented by "300". The drain valve 500 includes a body 502 having an upper portion 502a and a lower portion 502b. The body 502 defines a longitudinally extending through-bore 510 that extends through the upper and lower portions 502a and 502b. The body 502 has an upper end 512 and a lower end 514. A foldable handle 524 (FIG. 11E) is coupled to the upper portion 502a of the body 502 at holes 522. The valve 500 also includes a retaining member 520 (FIGS. 11A to 11F) that extends into the bore 510 to retain a ball 516 (FIGS. 11D to 11G) that is in the bore 510.

The lower portion 502b of the body 502 may be configured similarly to the lower portion 202b of valve 200. For example, the lower portion 502b of the body 502 has an outer cylindrical surface 506 that defines one or more circumferential grooves 504 (FIGS. 11A to 11D) that receive corresponding seals 508 (FIGS. 11D to 11F). In one embodiment, the thickness (measured in the axial direction D-D in FIG. 11B) of each circumferential groove 504 is 0.110 inch. However, the dimensions of each respective circumferential groove 504 may be different to achieve desired sealing results. For example, although not shown in FIGS. 11A to 11G, the body 502 may define a plurality of staggered grooves, such as the grooves 204a, 204b, and 204c described herein to seal with tube 1. Also, the body 502 may define a plurality of grooves, such as grooves 204a, 204b, and 204c of body 202, that are not staggered, and may instead by aligned along axis D-D (FIG. 11B) and have the same diameter.

Figure 11A:
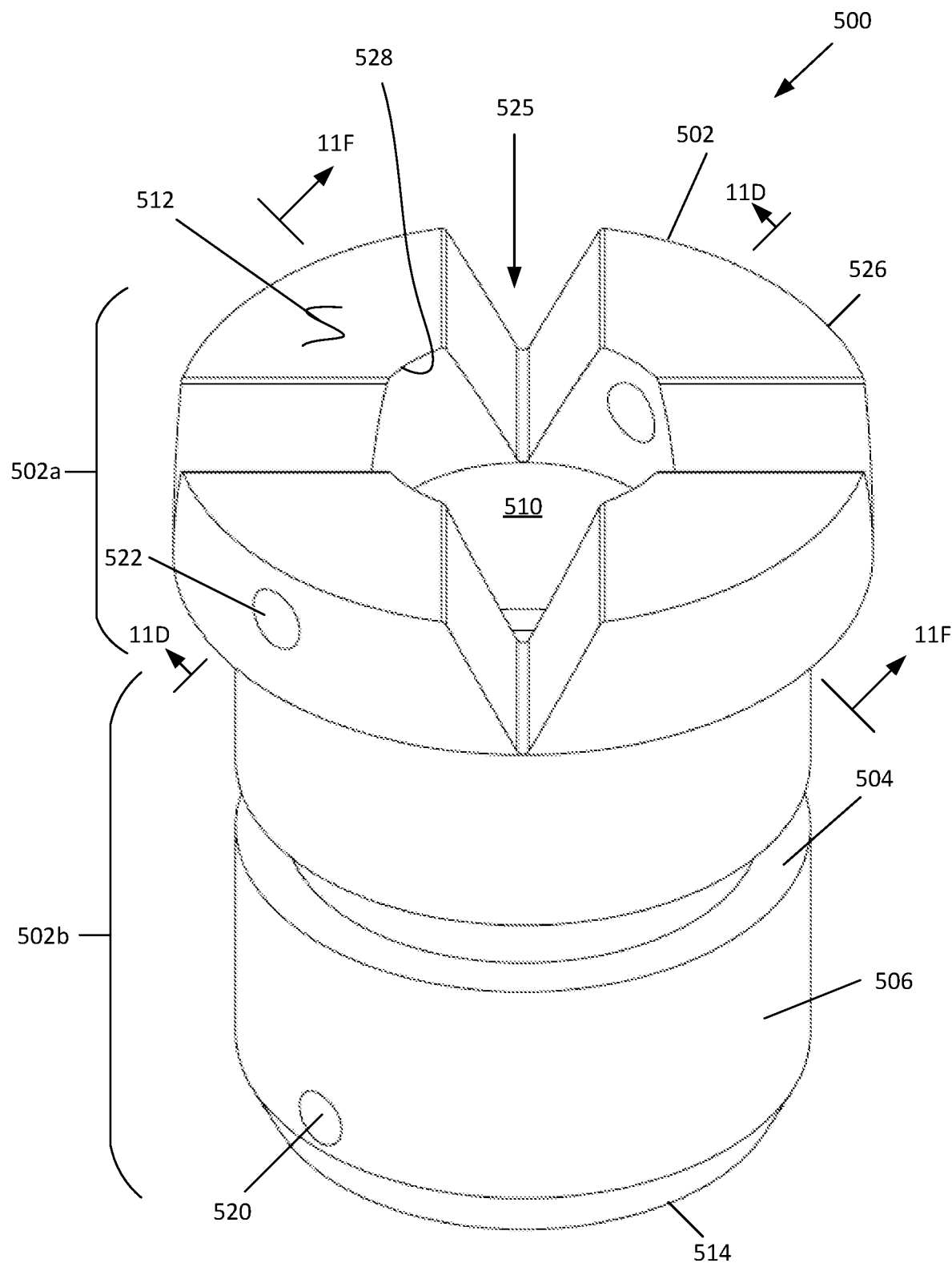
FIG. 11A shows an isometric view of another embodiment of a body of a drain valve with internal and external seals and handle of the valve omitted.
Figure 11B:
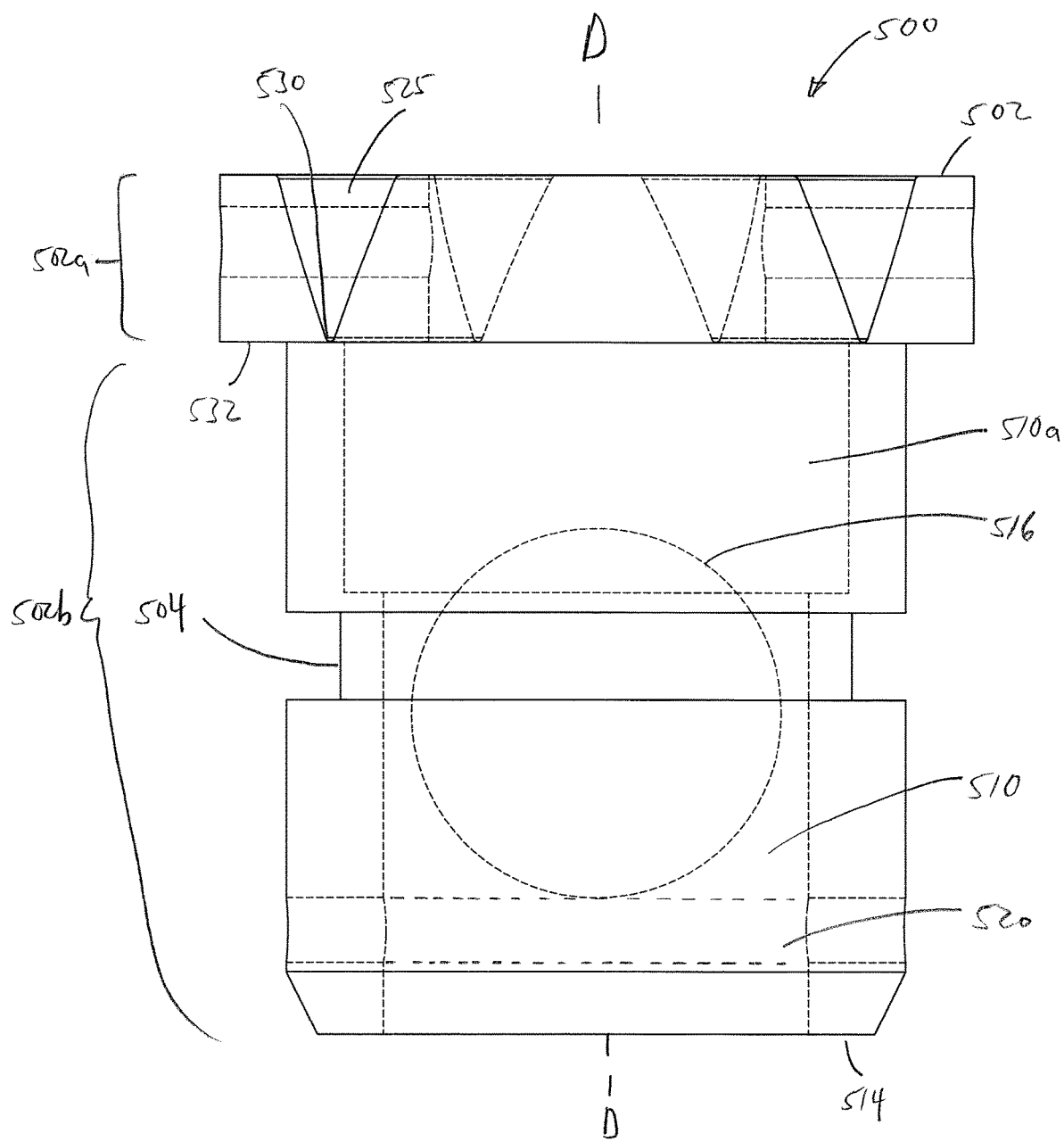
FIGS. 11B and 11C shows a side elevation view of the drain valve of FIG. 11A.
Figure 11C:
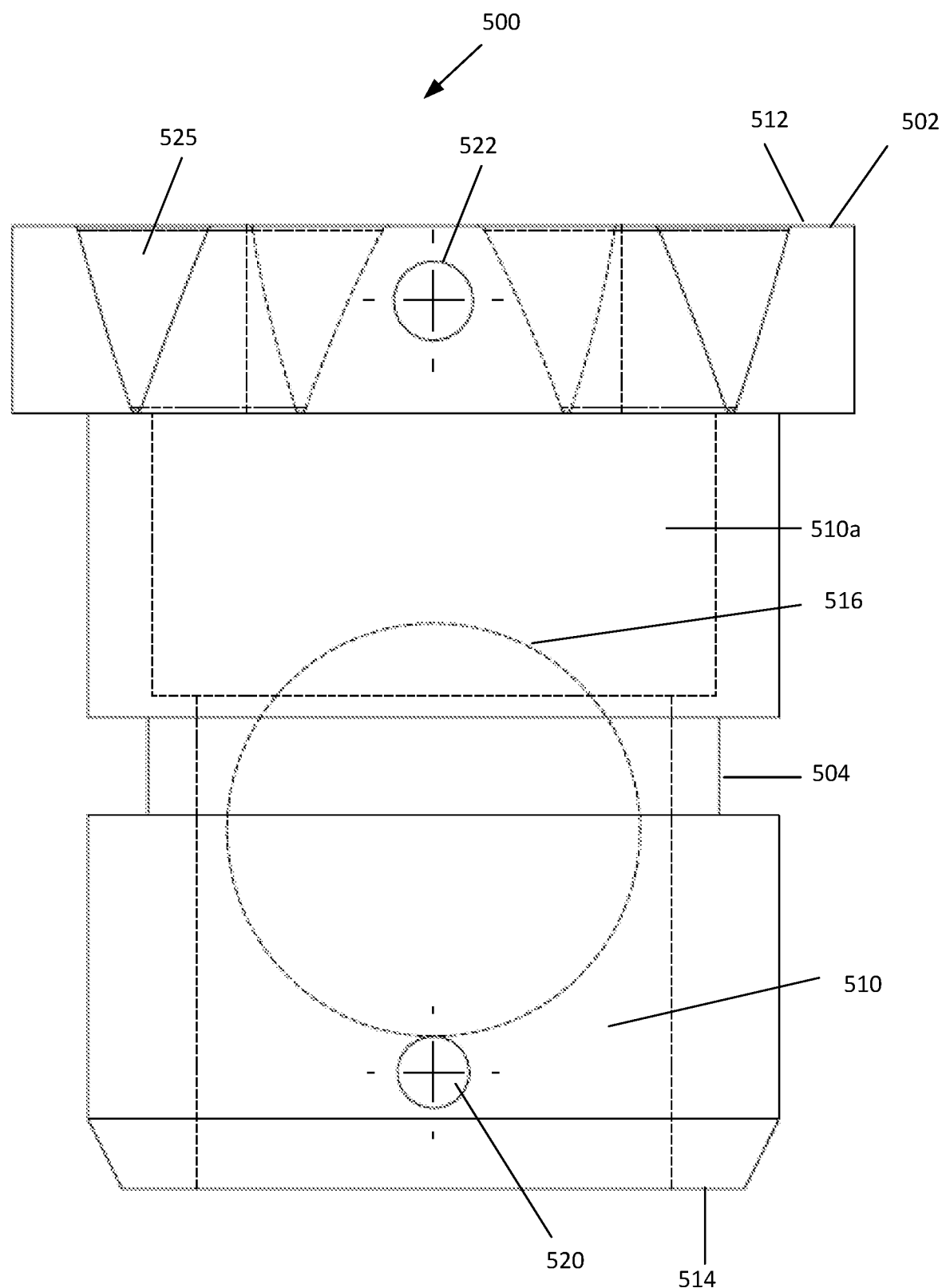
Figure 11D:
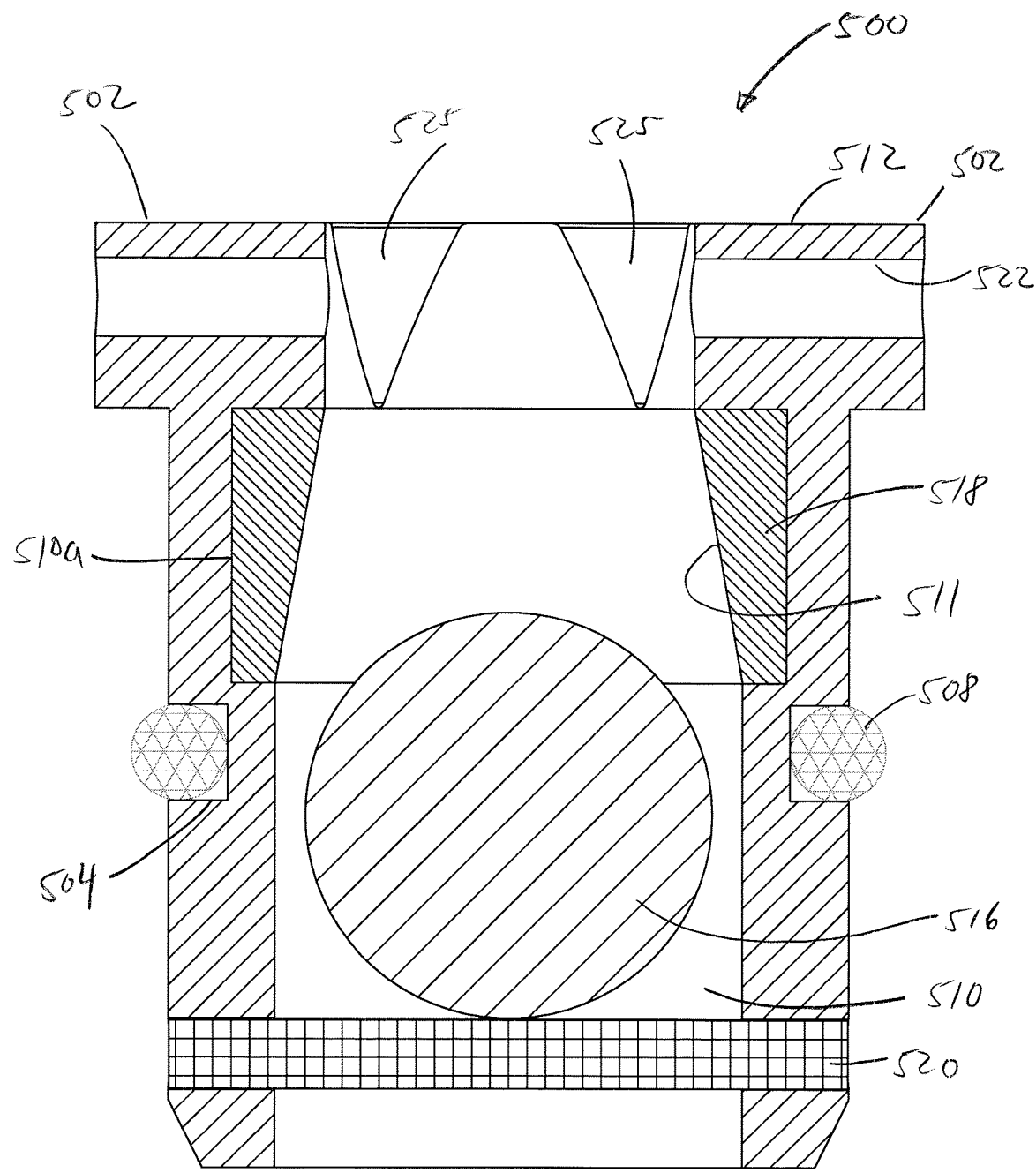
FIG. 11D shows a view of the drain valve of FIG. 11A, without the handle, through a section 11D-11D in FIG. 11A.
Figure 11E:
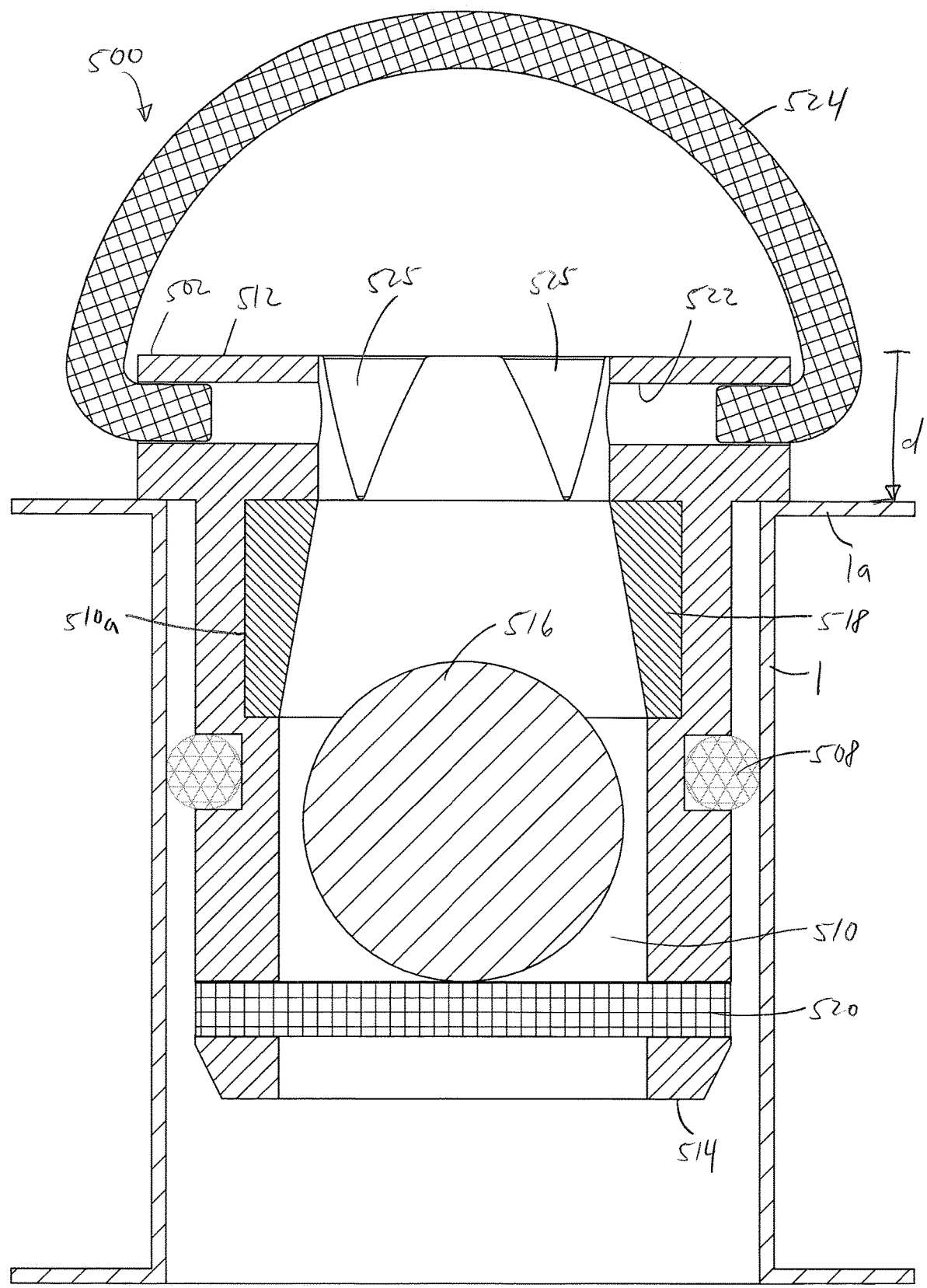
FIG. 11E shows a view of the drain valve of FIG. 11D, with the handle, sealed in a drain tube.
Figure 11F:
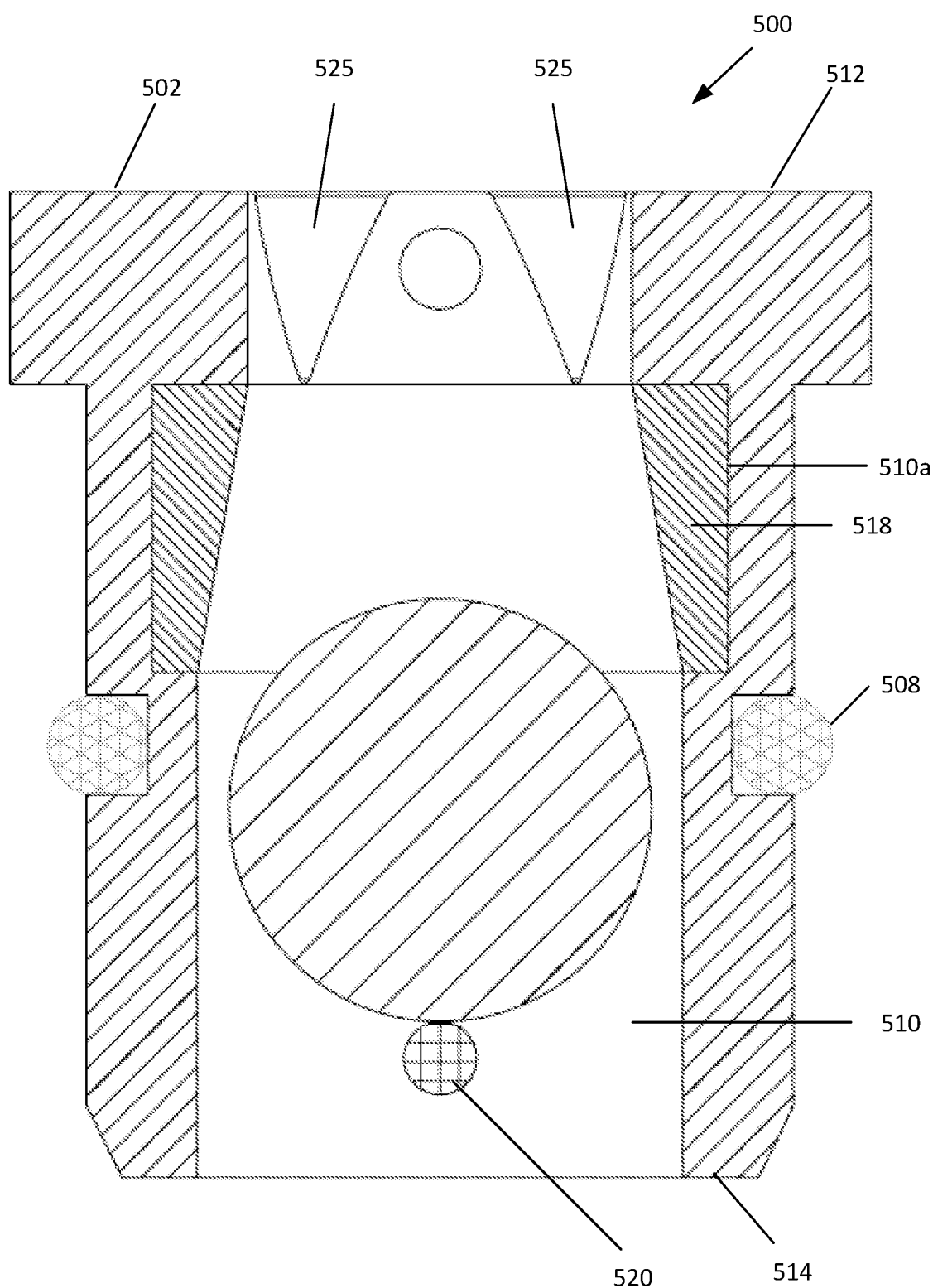
FIG. 11F shows a view of the drain valve of FIG. 11A, without the handle, through a section 11F-11F in FIG. 11A.
Figure 11G:
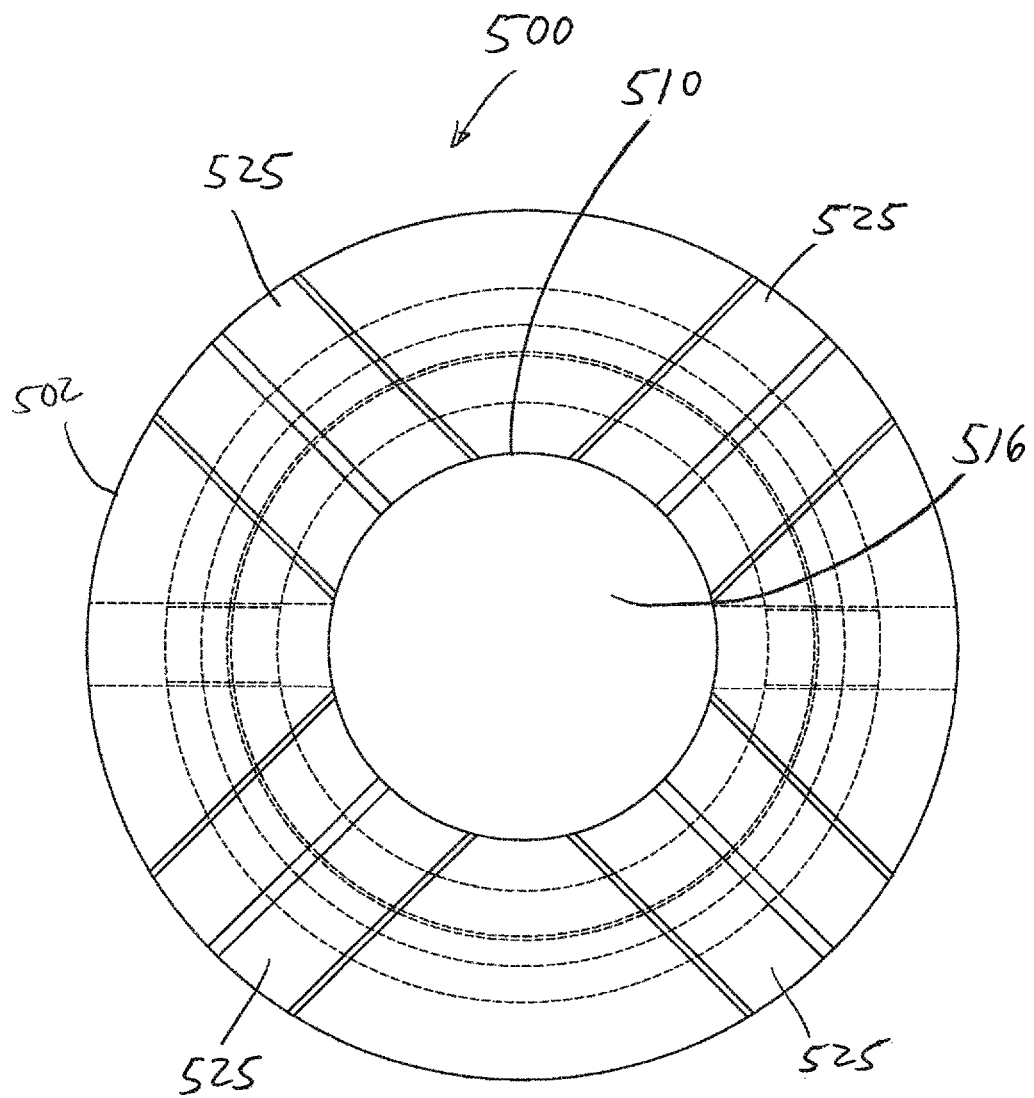
FIG. 11G shows a top view of the drain valve of FIG. 11A.

The body 502 also defines a cylindrical groove 510a in the bore 510 that receives (i.e., seats) an annular seal 518 (FIGS. 11D to 11F). The annular seal 518 has a linearly tapered sealing surface 511 (i.e., a frustoconical surface) that is configured to operatively seal with the buoyant ball 516 in the bore 510 and to retain the ball 516 between the retaining member 520 and the seal 518. The movement of the ball 516 and the operation thereof in draining water from the boat is identical to that described hereinabove for ball 216 in connection with valve 200 and is not repeated here for sake of brevity. While the annular seal 518 may, in embodiments, be a separate member from the body 502, it will be appreciated that the seal 518 and the body 502 may be a unitary piece, such as being made of one or more molded material, such as rubber, silicone, or plastic. Also, while a frustoconical surface having a linearly tapered cross sectional profile has been described for sealing surface 511, it will be appreciated that the sealing surface 511 may have other shapes and profiles. For example, it is contemplated that the sealing surface 511 may have other tapered profiles, including concave or convex profiles, or combinations thereof, with or without linear segments.

As shown in FIG. 11E, the valve 500 can be installed in the drain tube 1, and the valve 500 can be installed in the same manner described herein for valve 100. Valve 500 and valve 200 have the same configuration of the upper portion 502a of valve 500, which defines at least one groove or aperture 525 (FIGS. 11A to 11G), which is configured to direct fluid that is below the upper end 512 of the body 502 to drain into the bore 510 and through the drain tube 1 (FIG. 11E). Also, the cylindrical bore 510a that receives the seal 518 may be located in the lower portion 502b at a depth below the groove or aperture 525. This can accommodate a depth "d" of groove 525 that is at (or below) the level of the flange 1a of the drain tube 1 (or below the internal wall of the vessel) when the valve 500 is fully seated in the drain tube 1. When so configured, the groove 525 can mitigate puddling of water around the upper portion 502a and direct such water surrounding the upper portion 502a through the groove 525 into the bore 510 and then out of the drain tube 1 when the valve 500 is installed in the drain tube 1, as shown in FIG. 11E.

The upper portion 502a of the body 502 has an outer diameter that is larger than the outer diameter of the lower portion 502b of the body 502. The upper portion 502a can thus act as a flange that can either remain spaced from or engage the rolled flange 1a of the drain tube 1 in the configuration where the valve 500 is fully seated in the drain tube 1, as shown in FIG. 11E. Thus, the upper portion 502a can act as a positive stop limiting how far down into the drain tube 1 the valve 500 can be located by a user.

FIGS. 12A to 12G show features of another embodiment of a drain valve 600, having features similar to those of drain valve 500 and 200. In FIGS. 12A to 12G, elements corresponding to those of drain valve 500 are incremented by "100". The drain valve 600 includes a body 602 having an upper portion 602a and a lower portion 602b. The body 602 defines a longitudinally extending through-bore 610 that extends through the upper and lower portions 602a and 602b. The body 602 has an upper end 612 and a lower end 614. A foldable handle 624 (FIG. 12E) is coupled to the upper portion 602a of the body 602 at holes 622. The valve 600 also includes a retaining member 620 (FIGS. 12A to 12F) that extends into the bore 610 to retain a ball 616 (FIGS. 12D to 12G) that is in the bore 610.

Figure 12A:
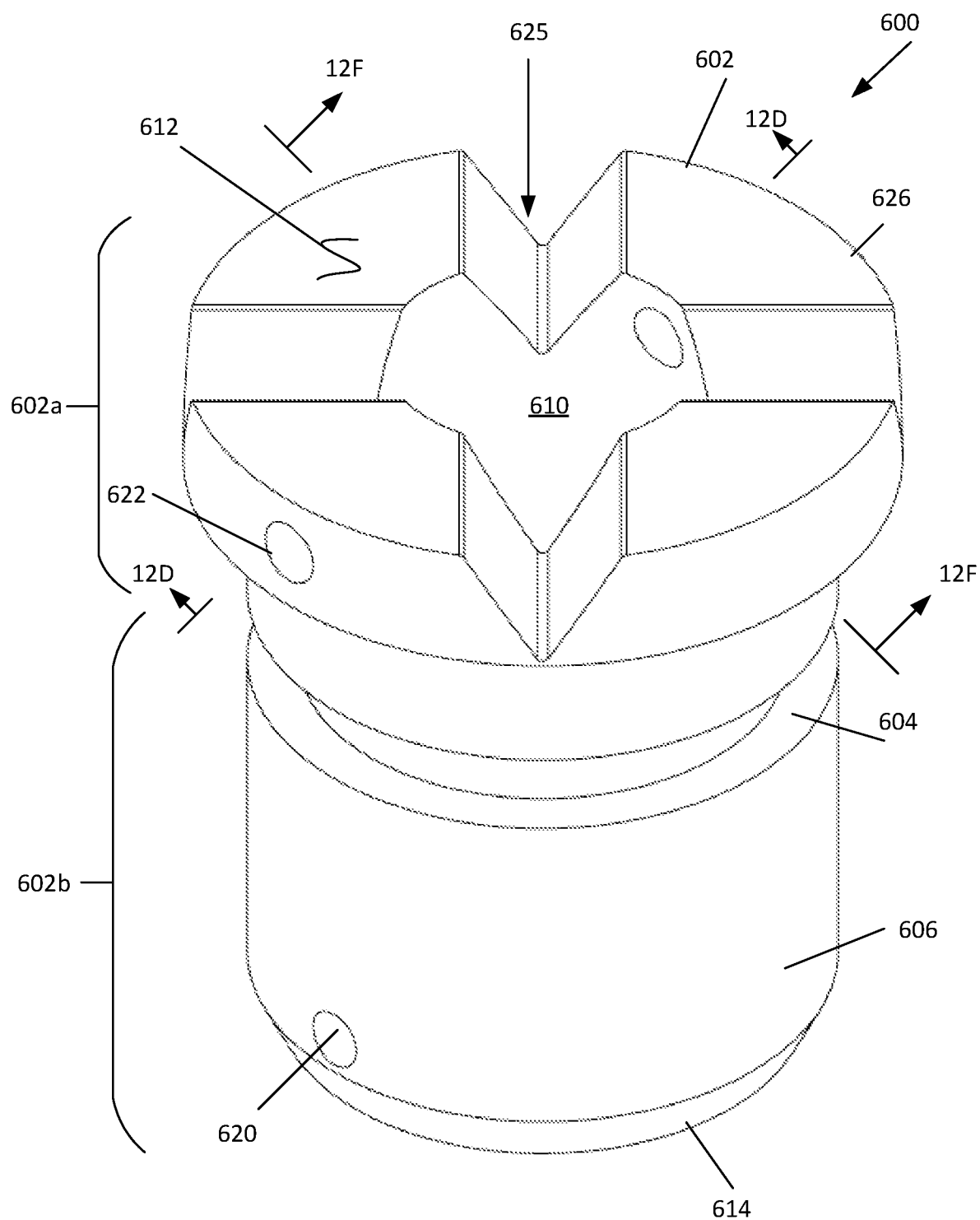
FIG. 12A shows an isometric view of another embodiment of a drain valve with internal and external seals and handle of the valve omitted.
Figure 12B:
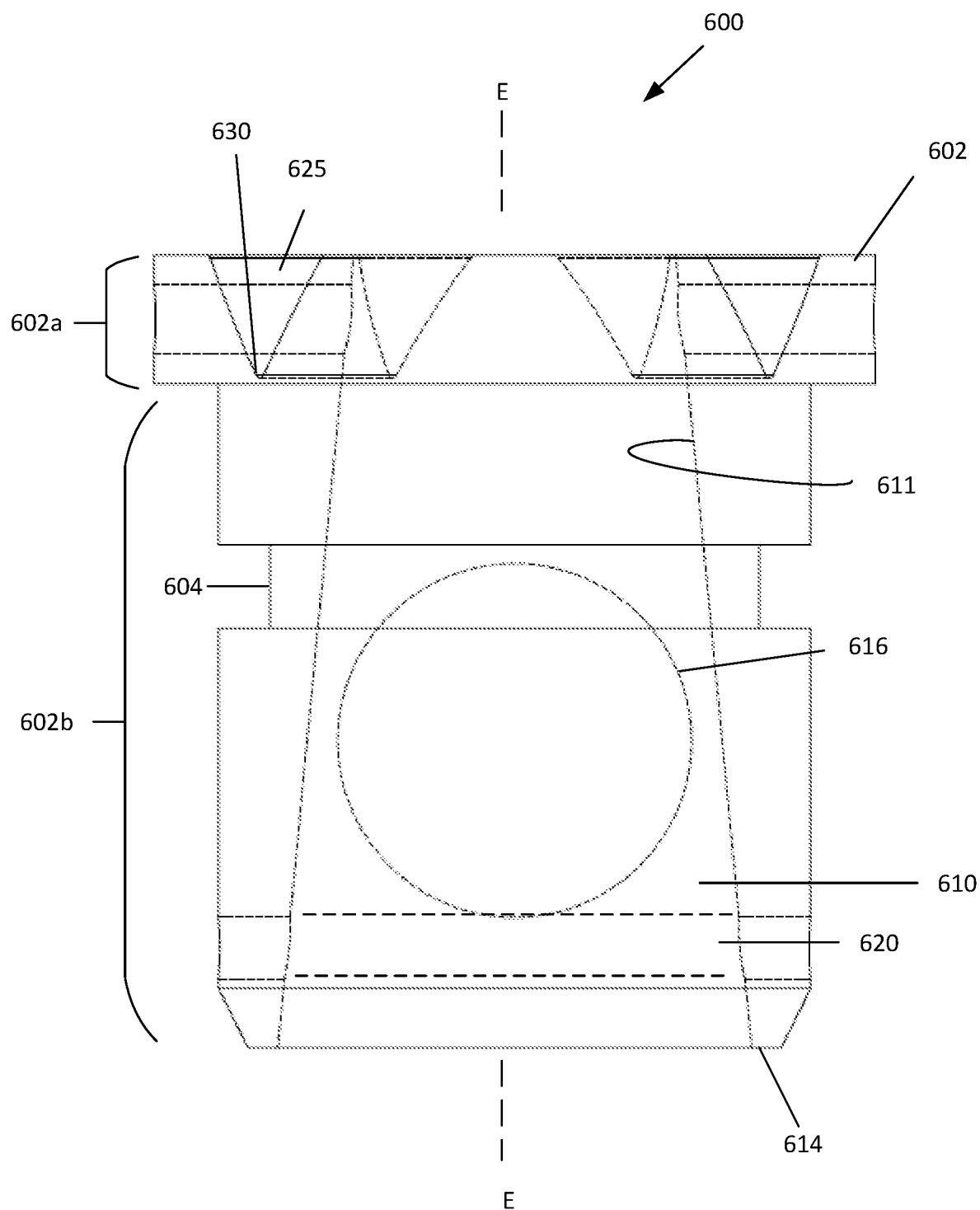
FIGS. 12B and 12C shows a side elevation view of the drain valve of FIG. 12A.
Figure 12C:
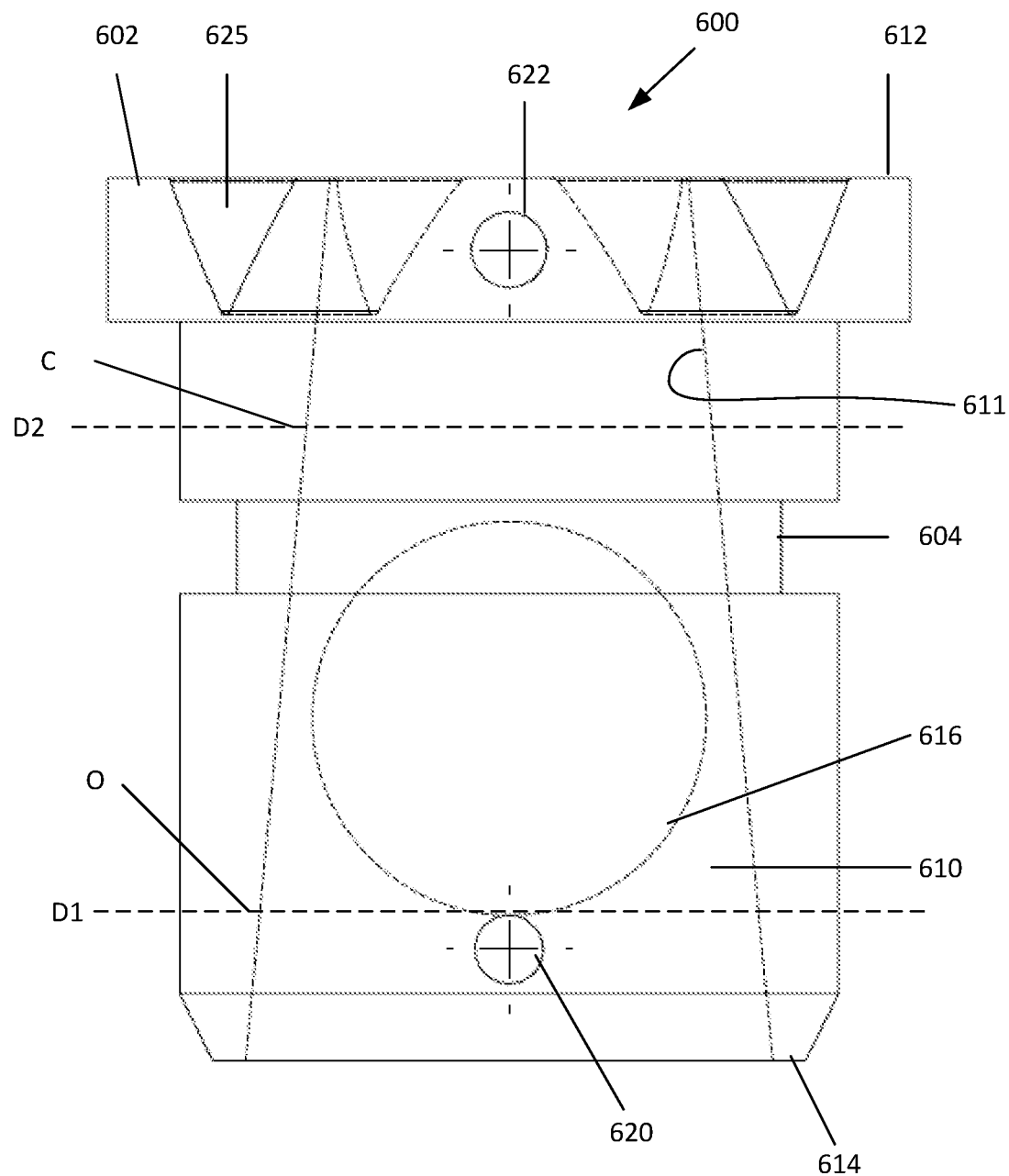
Figure 12D:
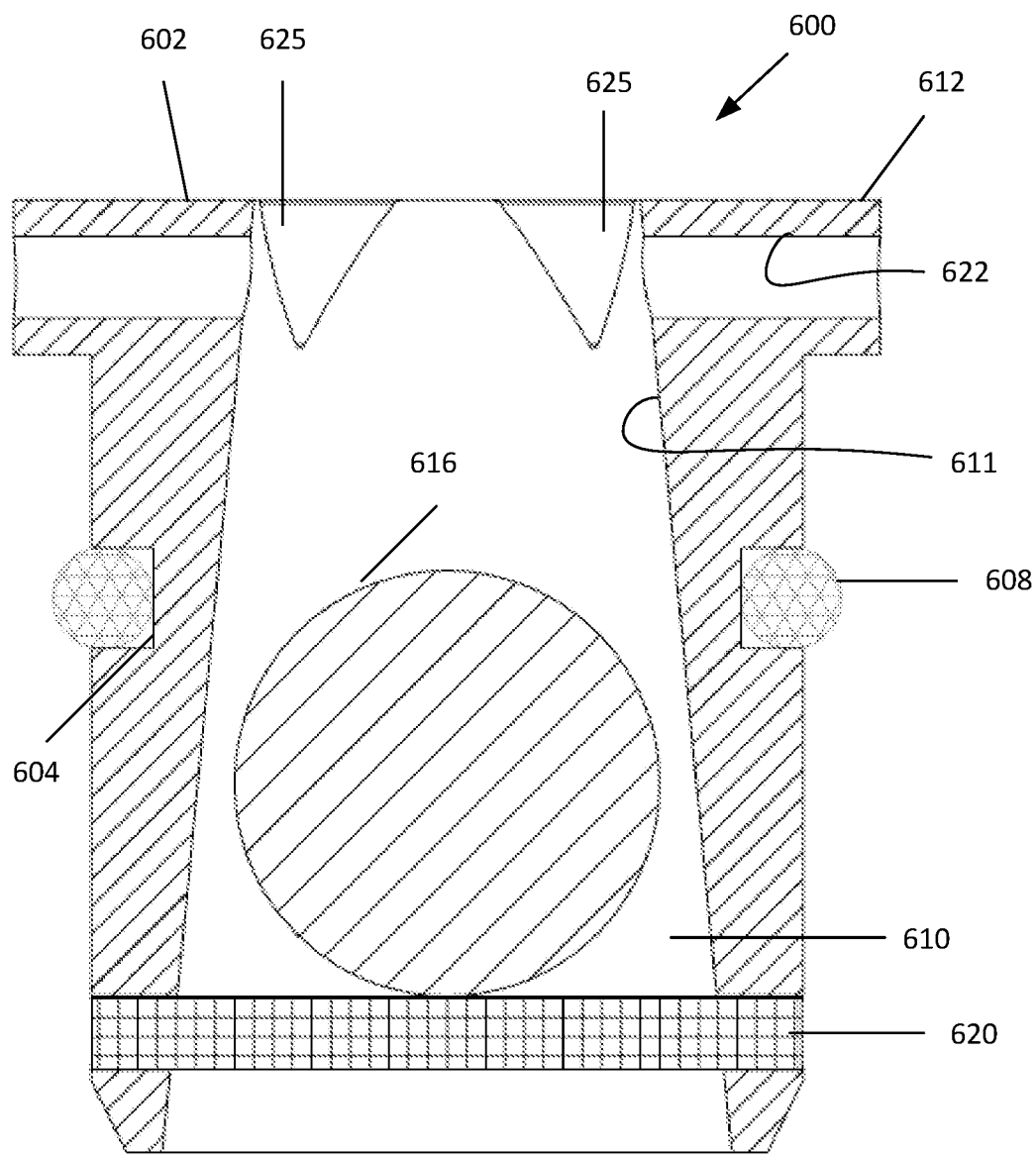
FIG. 12D shows a view of the drain valve of FIG. 12A, without the handle, through a section 12D-12D in FIG. 12A.

The lower portion 602b of the body 602 may be configured similarly to the lower portion 502a of valve 500, but with the following exceptions. The body 602 extends longitudinally along a central axis E-E (FIG. 12B). For example, the bore 610 is continuously tapered from the first end 612 to the second end 614 of the body 602. Specifically, the bore 610 is defined by a frustoconical surface 611 that is tapered in a direction toward the first end 612. At an axial position "O" of the retaining member in FIG. 12C, the bore 610 has a first diameter "D1" that is larger than the diameter of the ball 610, such that when the ball 616 is operatively engaged with the retaining member, the valve 600 is in a valve opened configuration. At the axial position "C" in FIG. 12C, the bore 610 has a second diameter "D2" that is slightly less than the diameter of the ball 616 and less than the diameter D1. Thus, when the ball 616 is operatively engaged with the surface 611 at position C, the valve 600 is in the valve closed configuration. The ball 616 has a range of motion between the closed and open positions. The movement of the ball 616 and the operation thereof in draining water from the boat is identical to that described hereinabove for ball 516 in connection with valve 500 and is not repeated here for the sake of brevity.

While the sealing surface 611 is described as being a unitary part of the body 602, it will be appreciated that the surface 611 may be part of a separate seal, like seal 518, that extends along substantially the entire length of the bore 610 and sits in a groove, like circumferential groove 510a, that extends along substantially the entire length of such bore. Also, it will be appreciated that the surface 611 may not extend completely from the first open end 612 to the second open end 614. For example, the tapered portion of surface 611 may, in embodiments, only extend between the closed position C and the open position O.

Also, while a frustoconical surface has been described for surface 611 it will be appreciated that the surface 611 may have other shapes and profiles. For example, it is contemplated that the surface 611 may have other tapered profiles, including concave or convex profiles, or combinations thereof, with or without linear segments. The remainder of valve 600 may correspond to valve 500, which will not be repeated for the sake of brevity.

Figure 12E:
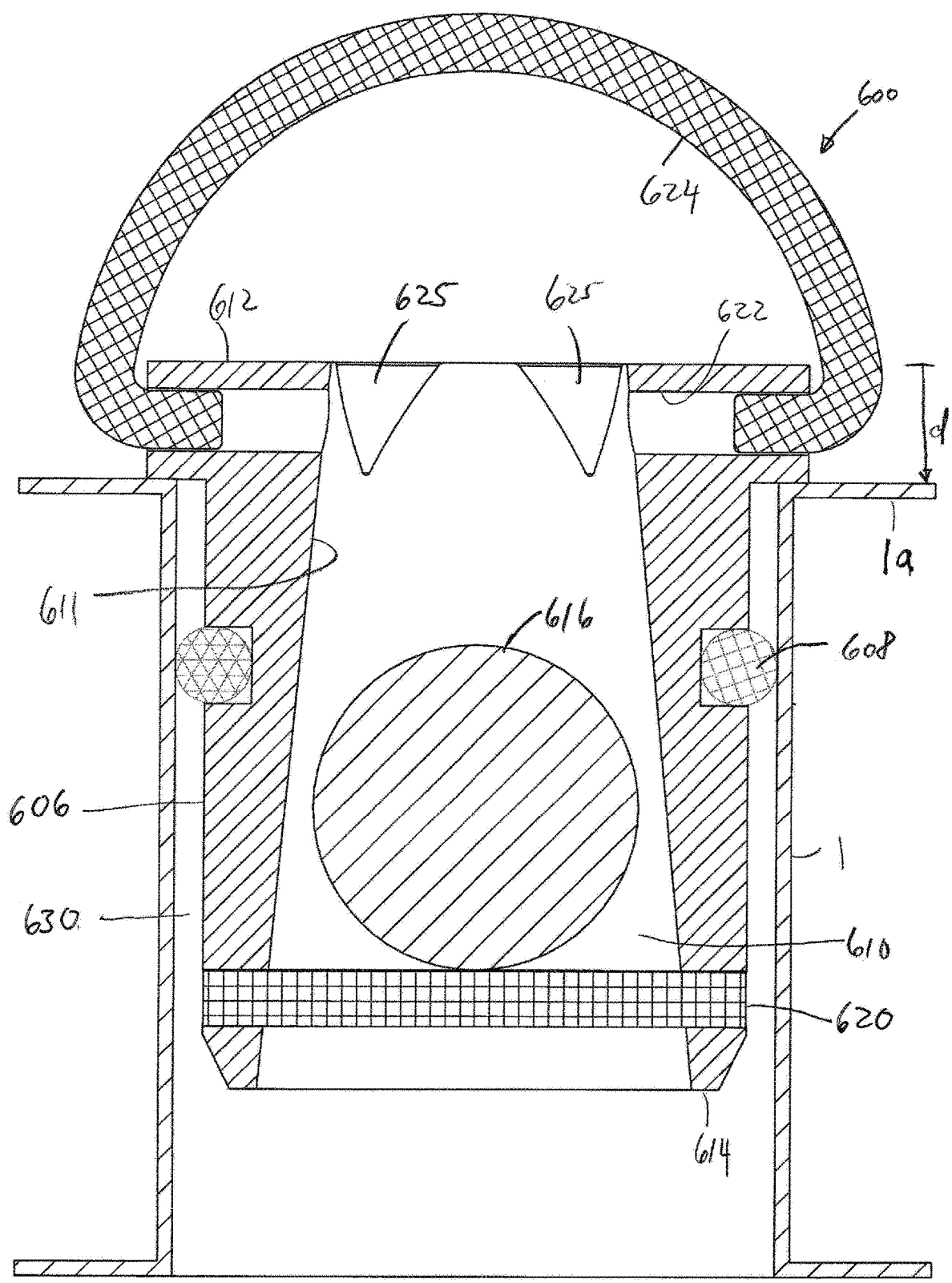
FIG. 12E shows a view of the drain valve of FIG. 12D, with the handle, sealed in a drain tube.
Figure 12F:
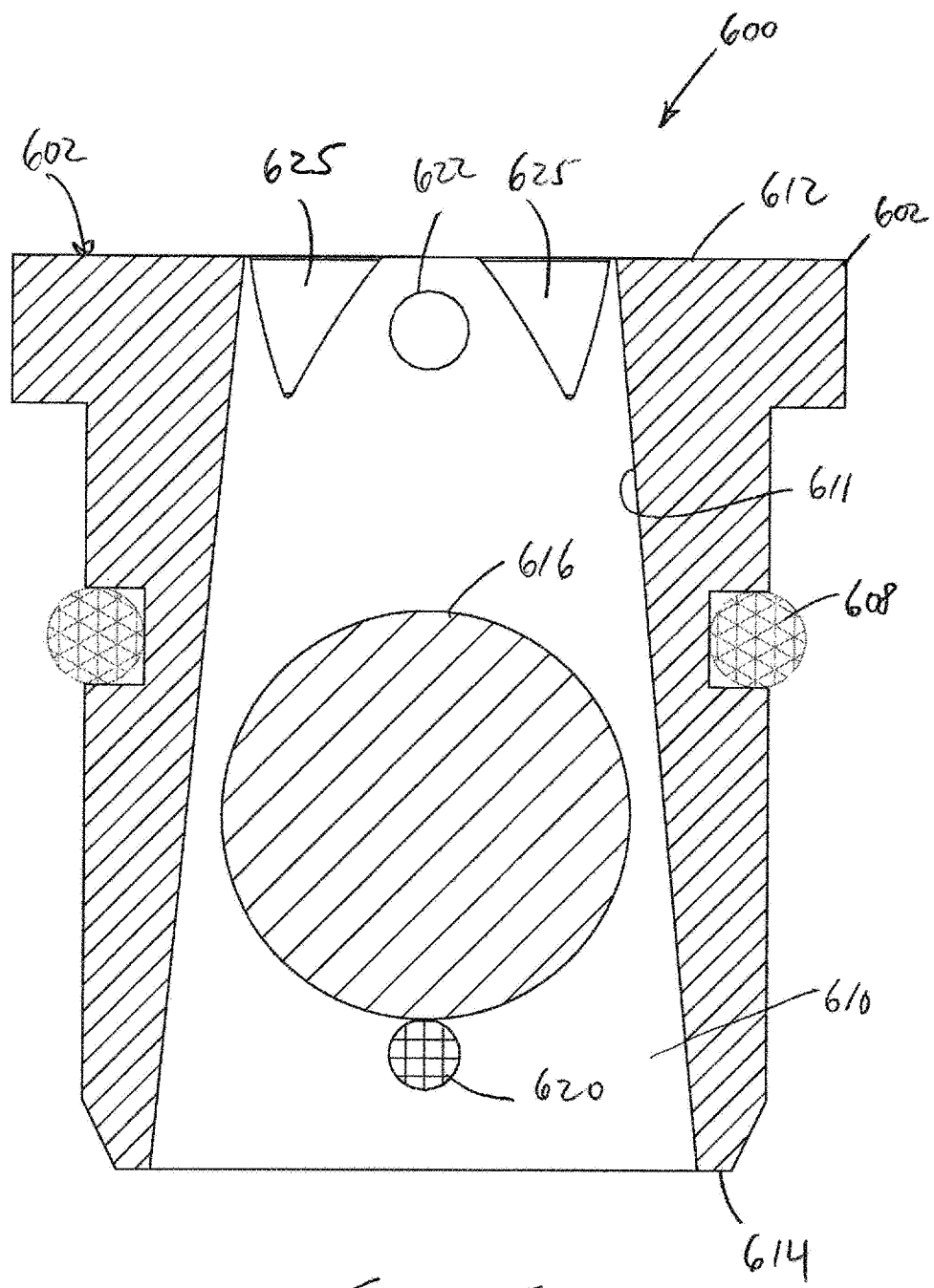
FIG. 12F shows a view of the drain valve of FIG. 12A, without the handle, through a section 12F-12F in FIG. 12A.
Figure 12G:
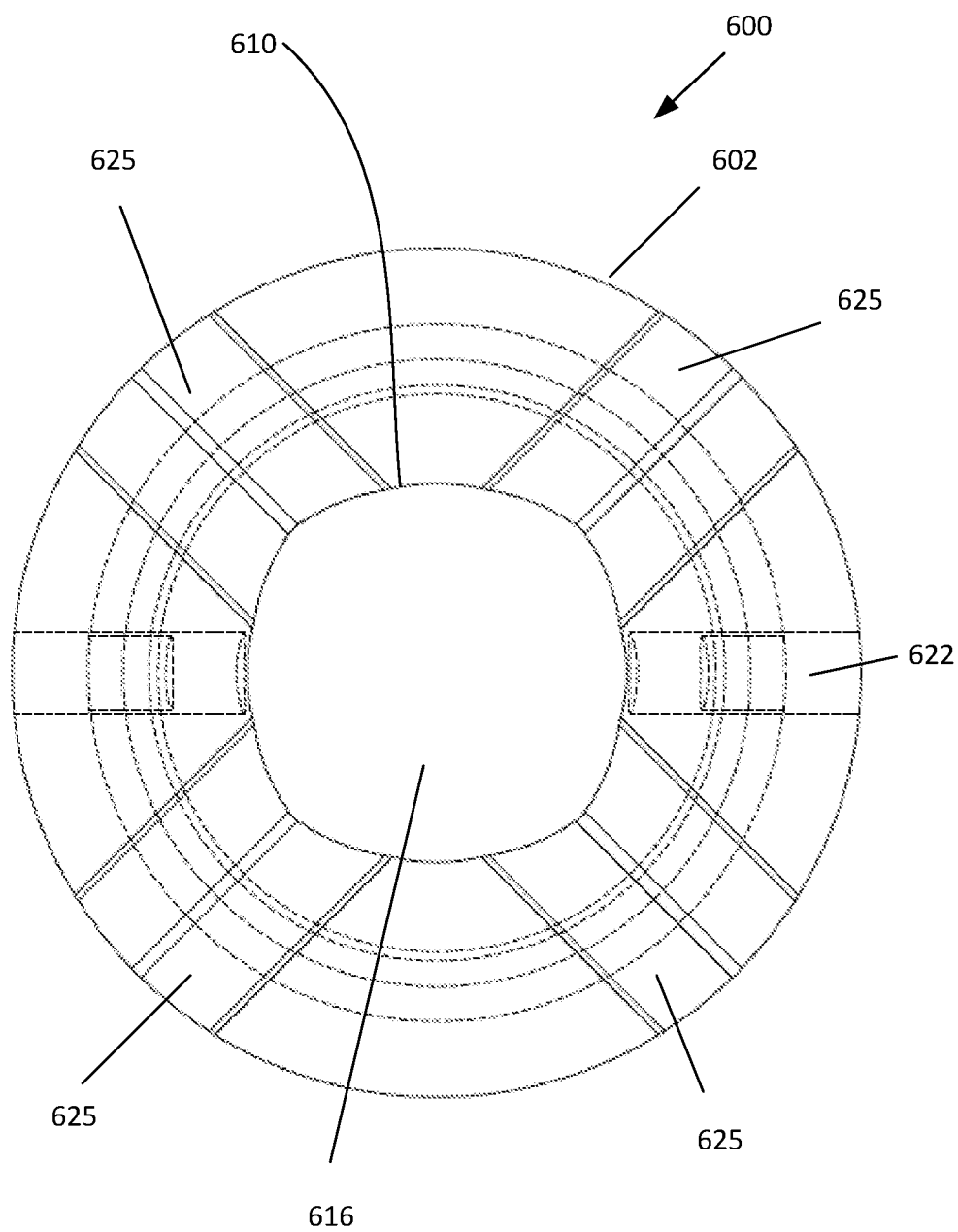
FIG. 12G shows a top view of the drain valve of FIG. 12A.
Figure 13A:
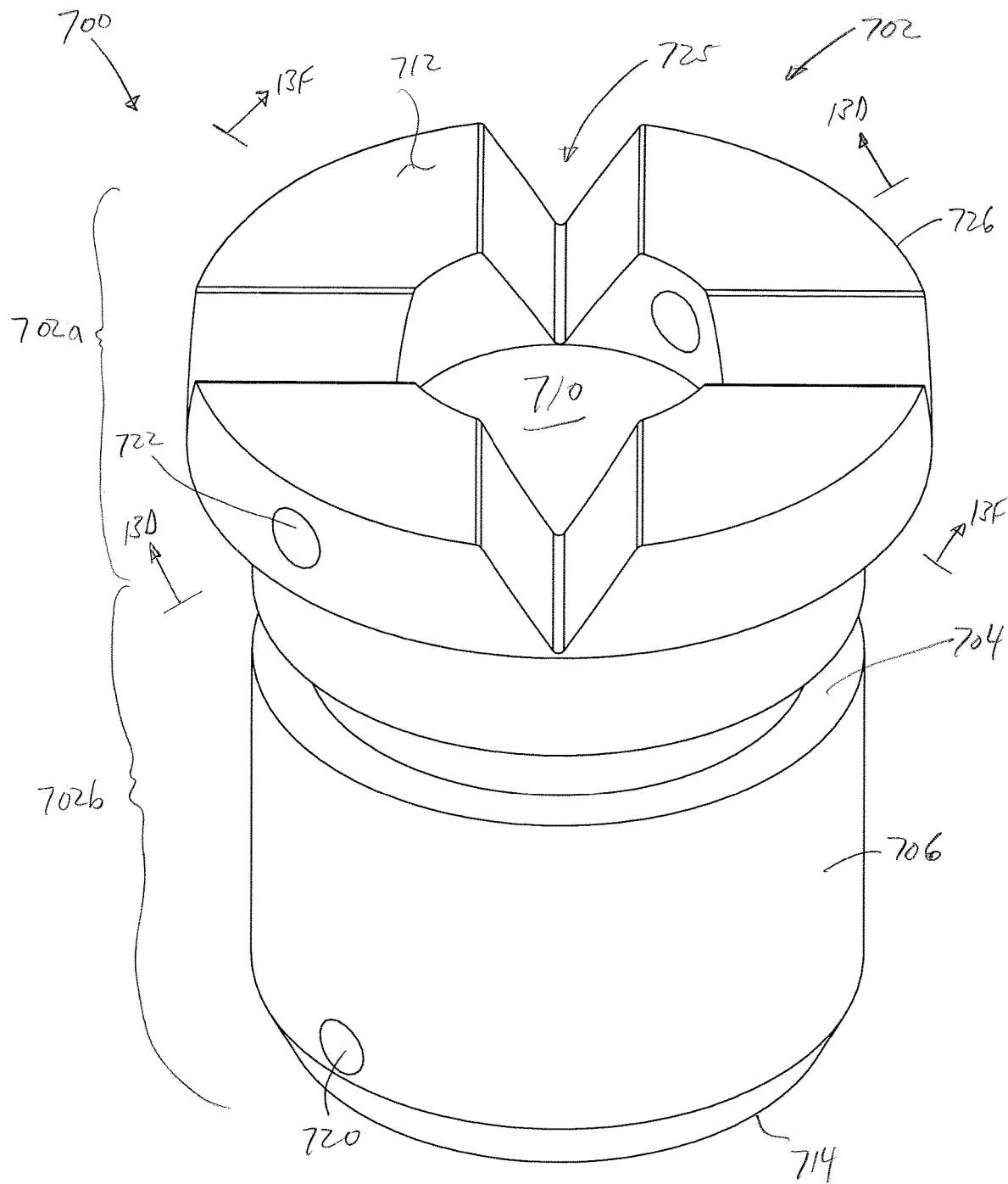
FIG. 13A shows an isometric view of another embodiment of a drain valve with internal and external seals and handle of the valve omitted.
Figure 13B:
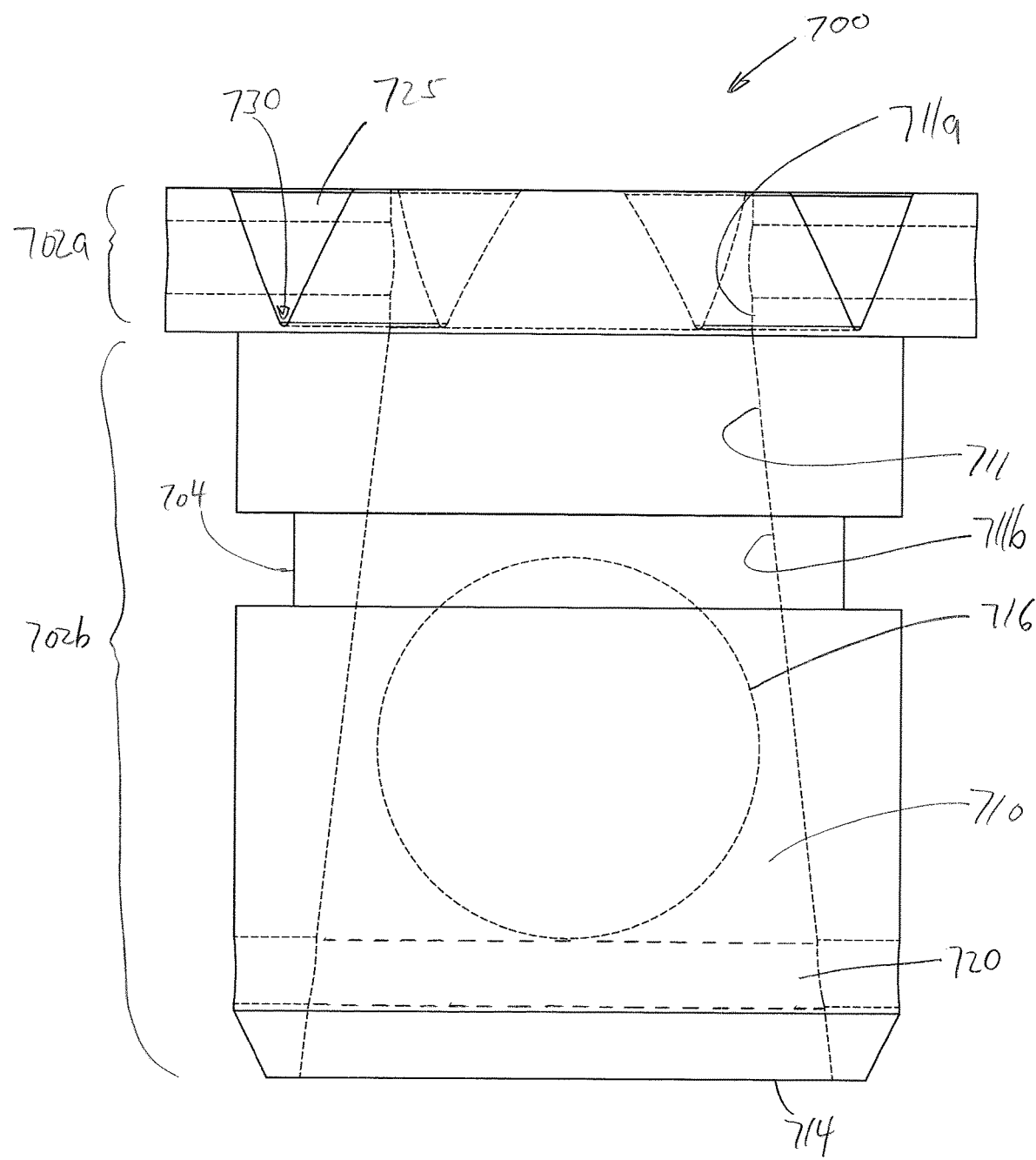
FIGS. 13B and 13C shows a side elevation view of the drain valve of FIG. 13A.
Figure 13C:
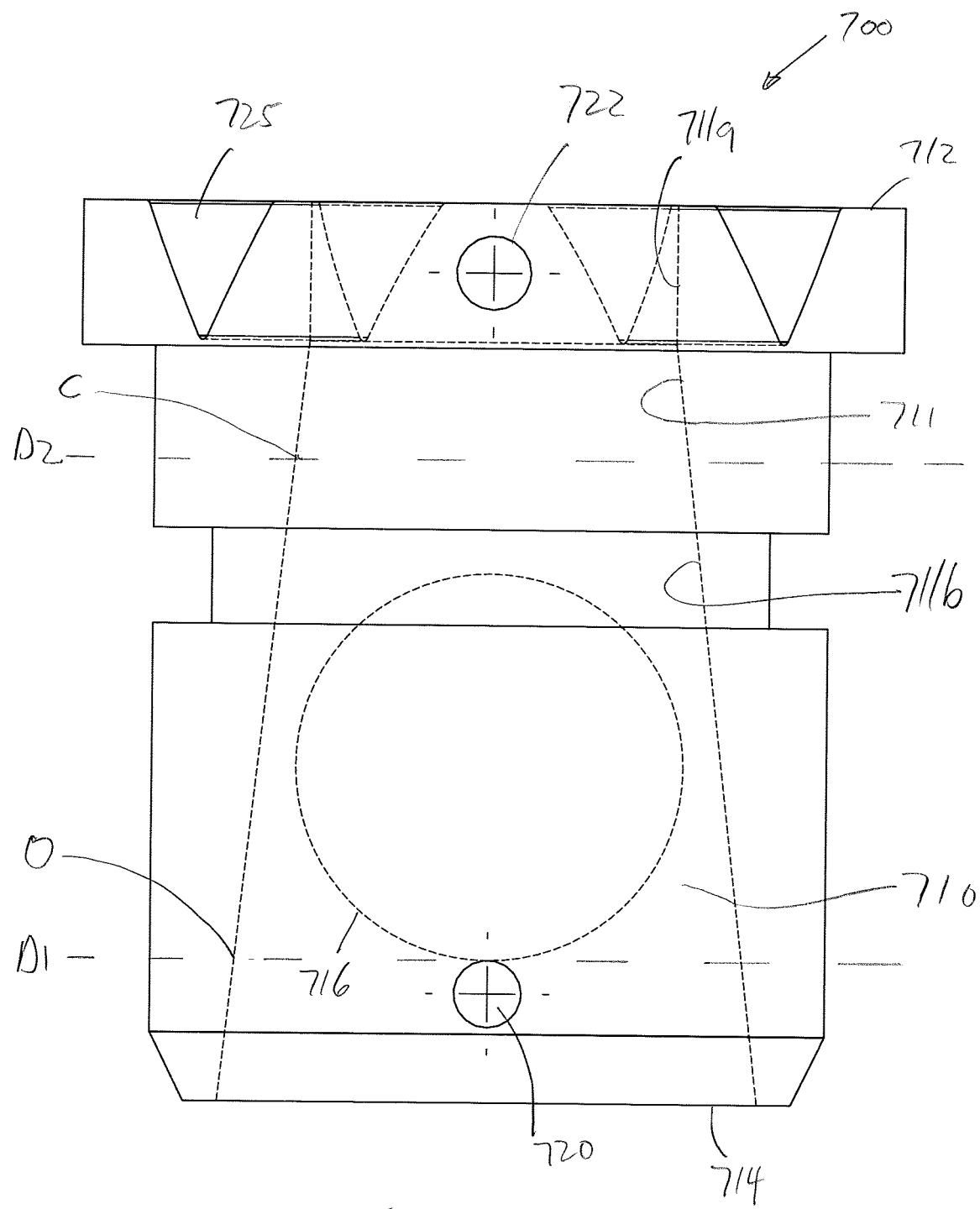
Figure 13D:
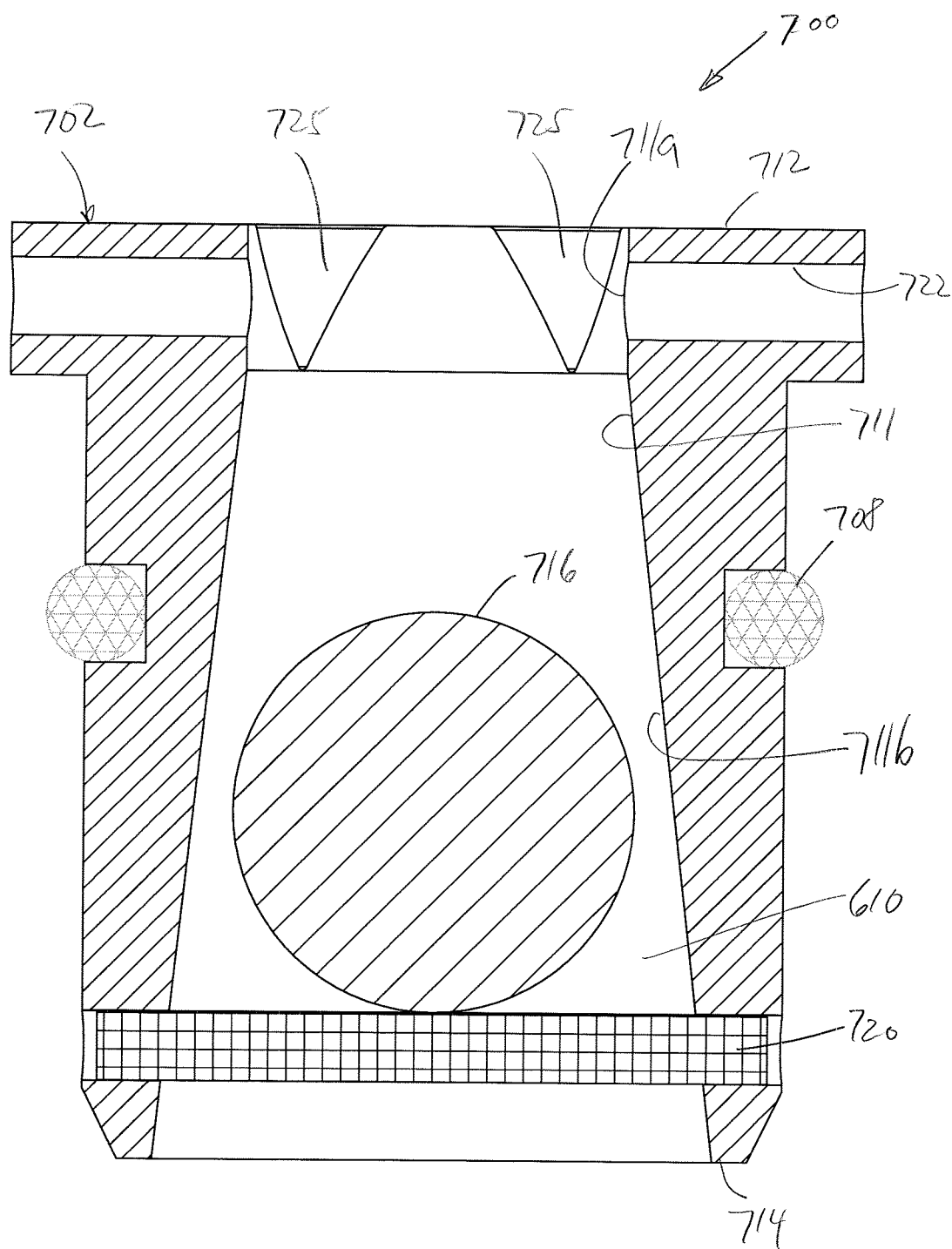
FIG. 13D shows a view of the drain valve of FIG. 13A, without the handle, through a section 13D-13D in FIG. 13A.
Figure 13E:
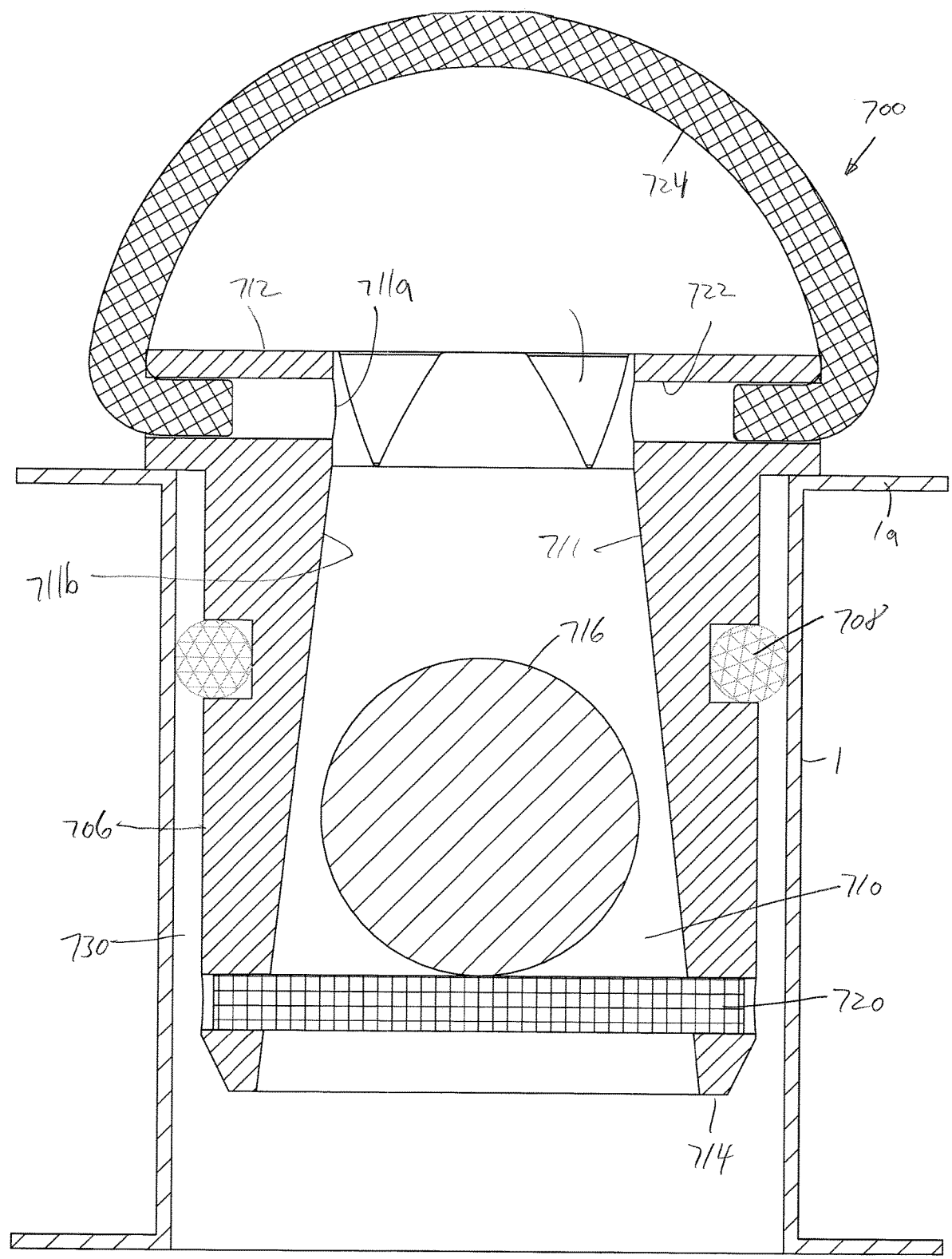
FIG. 13E shows a view of the drain valve of FIG. 13D, with the handle, sealed in a drain tube.
Figure 13F:
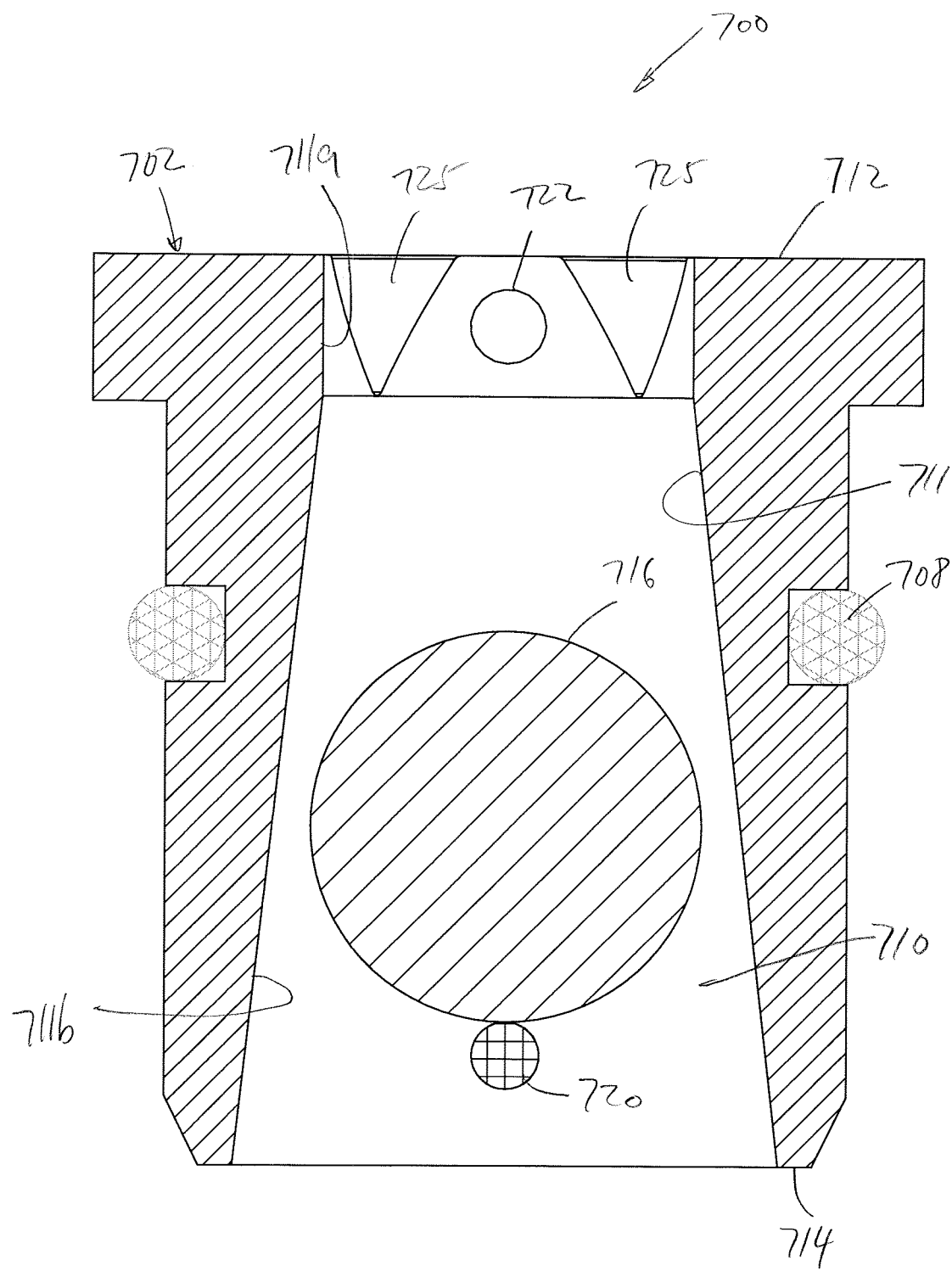
FIG. 13F shows a view of the drain valve of FIG. 13A, without the handle, through a section 13F-13F in FIG. 13A.
Figure 13G:
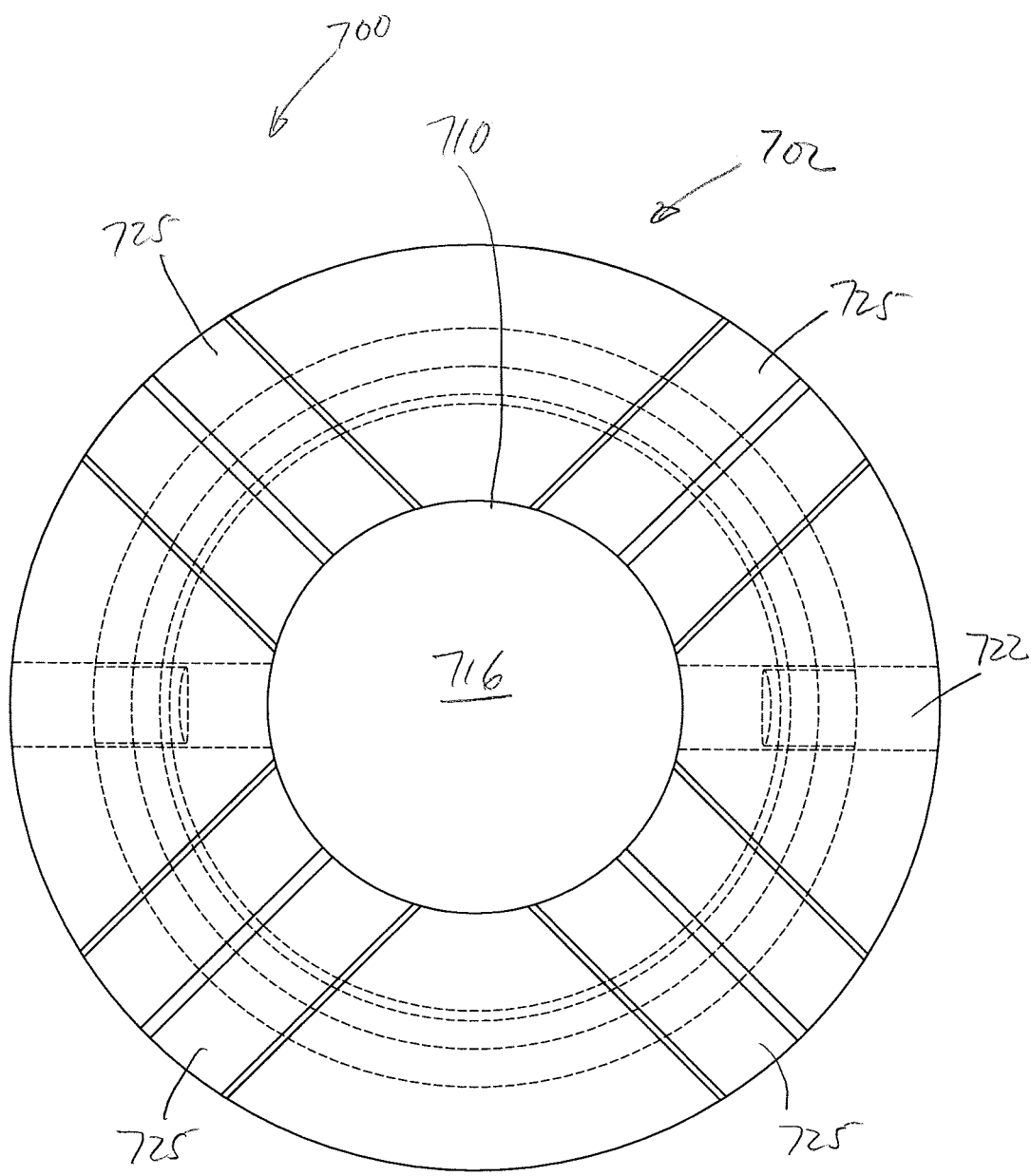
FIG. 13G shows a top view of the drain valve of FIG. 13A.

As shown in FIG. 12E, the valve 600 can be installed in the drain tube 1 in the same manner described herein for valve 100 and as shown in FIG. 5C. When installed, the upper portion 602a of the body 602 may engage the flange 1a of the drain tube 1. Also, as shown in FIG. 12E, owing to thickness of seal 608, there is an annular gap 630 between the outer surface 606 and an inner surface of the drain tube 1.

Valve 600 and valve 200 have the same configuration of the upper portion 602a of valve 600, which defines at least one groove or aperture 625 (FIGS. 12A to 12G), which is configured to direct fluid that is below the upper end 612 of the body 602 to drain into the bore 610 and through the drain tube 1 (FIG. 12E). Also, the cylindrical bore 610a that receives the seal 618 may be located in the lower portion 602b at a depth below the groove or aperture 625. This can accommodate a depth "d" (FIG. 12E) of groove 625 that is at (or below) the level of the flange 1a of the drain tube 1 (or below the internal wall of the vessel) when the valve 600 is fully seated in the drain tube 1. When so configured, the groove 625 can mitigate puddling of water around the upper portion 602a and direct such water surrounding the upper portion 602a through the groove 625 into the bore 610 and then out of the drain tube 1 when the valve 600 is installed in the drain tube 1, as shown in FIG. 12E.

The upper portion 602a of the body 602 has an outer diameter that is larger than the outer diameter of the lower portion 602b of the body 602. The upper portion 602a can thus act as a flange that can either remain spaced from or engage the rolled flange 1a of the drain tube 1 in the configuration where the valve 600 is fully seated in the drain tube 1, as shown in FIG. 12E. Thus, the upper portion 602a can act as a positive stop limiting how far down into the drain tube 1 the valve 600 can be located by a user.

FIGS. 13A to 13G show an alternate embodiment of a drain valve 700 that corresponds to drain valve 600, with like elements incremented by "100". Valve 700 is the same as valve 600, except in the configuration of bore 710 and the surface 711 of the bore 710. Specifically, rather than being continuously tapered from end 712 to 714, the surface 711 of the bore 710 has a constant diameter portion 711a in the upper portion 702a of the body 702, and a continuously tapered portion 711b in the lower portion 702b. The constant diameter portion 711a of surface 711 adjoins the continuously tapered portion 711b.

The surface 711b is shown being frustoconical and having a linearly tapered profile. However, it will be appreciated that the surface 711b may have other shapes and profiles. For example, it is contemplated that the surface 711b may have other tapered profiles, including concave or convex profiles, or combinations thereof, with or without linear segments. The remainder of valve 700 may correspond to valve 600, which will not be repeated for the sake of brevity. The valve 700 may be used with drain tube 1 in the same way as valve 600.

There have been described and illustrated herein several embodiments of a valve and a method of using the valve. While particular embodiments have been described, it is not intended that the invention be limited thereto, as it is intended that the invention be as broad in scope as the art will allow and that the specification be read likewise. Thus, while particular materials have been disclosed, it will be appreciated that other materials may be used as well. In addition, while particular dimensions have been disclosed, it will be understood that other dimensions can be used as required by the application. Moreover, while particular sealing configurations have been disclosed in reference to the lower portion of the valve, it will be appreciated that other sealing configurations could be used as well. It will therefore be appreciated by those skilled in the art that yet other modifications could be made to the provided invention without deviating from its spirit and scope as claimed.

What is claimed is:

1. A marine drain valve for use with a marine drain tube that extends through a wall of a marine vessel, the valve comprising:
    an elongated body extending along a central axis, the body having an outer surface and an inner surface defining an inner bore extending longitudinally through the body from a first open end of the body to a second open end of the body, the body configured to be positioned at least partly in the drain tube, wherein the inner surface of the bore has at least a tapered portion having a tapered inner sealing surface that is tapered longitudinally from a first diameter to a second diameter that is smaller than the first diameter;
    at least one external seal extending from the outer surface of the body, the external seal configured to seal with the drain tube;
    a retaining member extending at least partially into the bore, the retaining member being spaced longitudinally from the second diameter; and
    a buoyant sealing member disposed and retained between the second diameter and the retaining member, the sealing member being longitudinally displaceable in the bore between the second diameter and the retaining member and configured to seal with the tapered sealing surface in a valve closed, first configuration when the buoyant sealing member is at the second diameter and is configured to not seal with the tapered sealing surface in a valve open, second configuration when the buoyant sealing member is spaced from the second diameter, wherein in the valve opened position, fluid is permitted to flow through the inner bore in a direction from the first open end to the second open end.

2. The valve according to claim 1, wherein the tapered inner sealing surface has a profile that is at least partially linearly tapered.

3. The valve according to claim 1, wherein the tapered inner sealing surface has a profile that is at least partially convex or concave.

4. The valve according to claim 1, wherein the tapered sealing surface is a surface of an internal seal that is connected to the body within the bore.

5. The valve according to claim 4, wherein the internal seal is an annular seal.

6. The valve according to claim 5, wherein the annular seal is seated in a circumferential groove defined in an inner surface that defines the inner bore of the body.

7. The valve according to claim 1, wherein the at least one external seal has a tapered sealing surface that tapers along the longitudinal axis from a third diameter to a fourth diameter that is smaller than the third diameter.

8. The valve according to claim 7, wherein the at least one external seal is an annular seal seated in a circumferential groove formed in the outer surface of the body.

9. The valve according to claim 1, wherein the sealing member is a ball having a diameter that is greater than the second diameter.

10. The valve according to claim 1, wherein the inner tapered surface extends continuously from from the first open end to the second open end of the body.

11. The valve according to claim 1, wherein the body has an upper portion and a lower portion, the upper portion formed as a flange having an outer diameter larger than an outer diameter of the lower portion.

12. The valve according to claim 11, further comprising: a handle pivotally coupled to the upper portion of the body.

13. The valve according to claim 1, wherein the first end of the body is configured to be positioned in an interior compartment of the vessel.

14. The valve according to claim 1, wherein the first end of the body is configured to be positioned in the drain tube.

15. The valve according to claim 1, wherein the body defines at least one aperture extending through a wall of the body between a first end at a longitudinal position above an upper end of the drain tube to a second end that is below the upper end of the drain tube and above the at least one inner seal, wherein the first end of the aperture is at the outer surface of the body and the second end of the aperture is at the inner surface of the body.

16. The valve according to claim 1, wherein the body has a length that is less than a length of the drain tube.

17. The valve according to claim 1, wherein the first open end defines an inlet opening and the second open end defines an outlet opening, wherein the inlet and outlet opening are coaxially aligned along the longitudinal axis.

18. A method of installing a marine drain valve in a marine drain tube that extends through a wall of a marine vessel, the method comprising:
providing a valve according to claim 1; and
introducing the second end of the body of the valve into the drain tube and sealing the at least one external seal with the drain tube.

19. The method according to claim 18, wherein the first end of the body is configured to be positioned in an interior compartment of the vessel and wherein introducing the second end of the body includes positioning the first end of the body in an interior compartment of the vessel.

20. The method according to claim 18, wherein introducing the second end of the body includes positioning the first end of the body in either an interior compartment of the vessel, flush with an inner end of the drain tube, or below the inner end of the drain tube.

* * * * *